US012262265B2

United States Patent
Kumar et al.

(10) Patent No.: US 12,262,265 B2
(45) Date of Patent: Mar. 25, 2025

(54) CONDITIONAL PRIMARY SECONDARY CELL ADDITION OR CHANGE RECOVERY PROCEDURE

(71) Applicant: QUALCOMM Incorporated, San Diego, CA (US)

(72) Inventors: Rajeev Kumar, San Diego, CA (US); Punyaslok Purkayastha, San Diego, CA (US); Shankar Krishnan, San Diego, CA (US); Xipeng Zhu, San Diego, CA (US); Ozcan Ozturk, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/662,349

(22) Filed: May 6, 2022

(65) Prior Publication Data
US 2022/0361065 A1 Nov. 10, 2022

Related U.S. Application Data

(60) Provisional application No. 63/186,600, filed on May 10, 2021.

(51) Int. Cl.
*H04W 36/00* (2009.01)
(52) U.S. Cl.
CPC ... *H04W 36/0079* (2018.08); *H04W 36/0058* (2018.08); *H04W 36/00692* (2023.05); *H04W 36/00698* (2023.05)
(58) Field of Classification Search
CPC ....... H04W 36/0058; H04W 36/00692; H04W 36/00698; H04W 36/0079; H04W 36/0069; H04W 36/18; H04W 36/28
See application file for complete search history.

(56) References Cited

U.S. PATENT DOCUMENTS

| 2014/0269313 A1* | 9/2014 | Liu | H04W 24/02 370/252 |
| 2015/0195852 A1* | 7/2015 | Xu | H04W 72/20 370/329 |

(Continued)

FOREIGN PATENT DOCUMENTS

| WO | 2021066722 A1 | 4/2021 |
| WO | 2021067236 A1 | 4/2021 |

(Continued)

OTHER PUBLICATIONS

CATT: "Report of [post109e@13] [NR MOB] Resolving Open Issues for CPC", 3GPP TSG-RAN WG2 Meeting #109bis-e, R2-2003440, 3RD Generation Partnership Project, Mobile Competence Centre, 650, Route Des Lucioles, F-06921 Sophia-Antipolis Cedex, France, vol. RAN WG2, No. Online Meeting, 20200420-20200430 Apr. 10, 2020, XP051874938, 26 Pages, p. 6-14.

(Continued)

*Primary Examiner* — Stephen J Clawson
(74) *Attorney, Agent, or Firm* — Harrity & Harrity, LLP

(57) ABSTRACT

Various aspects of the present disclosure generally relate to wireless communication. In some aspects, a user equipment (UE) may receive, from a primary cell or a primary secondary cell (PSCell), configuration information for a conditional PSCell addition or change (CPAC), the configuration information indicating configurations for one or more candidate PSCells. The UE may detect a failure, associated with the conditional PSCell addition or change, associated with a first target PSCell from the one or more candidate PSCells. The UE may perform an action to recover the CPAC based at least in part on detecting the failure. Numerous other aspects are described.

30 Claims, 12 Drawing Sheets

(56) References Cited

U.S. PATENT DOCUMENTS

| | | | | |
|---|---|---|---|---|
| 2015/0271713 | A1* | 9/2015 | Kim | H04W 36/0058 |
| | | | | 455/437 |
| 2016/0066251 | A1* | 3/2016 | Sirotkin | H04W 8/02 |
| | | | | 370/328 |
| 2018/0278357 | A1* | 9/2018 | Kim | H04J 11/0076 |
| 2018/0279287 | A1* | 9/2018 | Wilson et al. | H04W 16/28 |
| 2019/0190582 | A1* | 6/2019 | Guo | H04B 17/17 |
| 2021/0105681 | A1* | 4/2021 | Paladugu | H04W 36/00837 |
| 2022/0053397 | A1* | 2/2022 | Huang | H04W 36/08 |
| 2022/0369173 | A1* | 11/2022 | Deng | H04W 36/00692 |
| 2022/0394583 | A1* | 12/2022 | Deenoo | H04W 24/08 |
| 2023/0047744 | A1* | 2/2023 | Wu | H04W 36/00837 |
| 2024/0298223 | A1* | 9/2024 | Liu | H04W 36/08 |

FOREIGN PATENT DOCUMENTS

| | | |
|---|---|---|
| WO | 2021091342 A1 | 5/2021 |
| WO | 2021234633 A1 | 11/2021 |
| WO | 2022032210 A1 | 2/2022 |

OTHER PUBLICATIONS

Futurewei: "Failure and Validation Handling on Intra-SN CPC", 3GPP TSG-RAN WG2 Meeting #109e, R2-2000446, 3rd Generation Partnership Project, Mobile Competence Centre, 650, Route Des Lucioles, F-06921 Sophia-Antipolis Cedex, France, vol. RAN WG2, No. 20200224-20200306 Feb. 14, 2020, XP051849034, 5 Pages, Chapter 2.1.2 Intra-SN CPC Failure Handling with Multiple Candidates.

Futurewei: "Handling of Multiple Candidate Cells For CPAC", 3GPP TSG-RAN WG2 Meeting #108, R2-1914986, 3rd Generation Partnership Project, Mobile Competence Centre, 650, Route Des Lucioles, F-06921 Sophia-Antipolis Cedex, France, vol. RAN WG2, No. Reno, USA, 20191118-20191122 Nov. 8, 2019, XP051816921, 4 Pages, Chapter 2.2 The Possible Changes to Support Multiple Candidates of CPAC.

International Search Report and Written Opinion—PCT/US2022/072212—ISA/EPO—Aug. 25, 2022.

LG Electronics Inc: "Consideration on Further Enhancements in CPAC", 3GPP TSG-RAN WG2 Meeting #113e, R2-2100728 (Revision of R2-2010282), 3RD Generation Partnership Project, Mobile Competence Centre, 650, Route Des Lucioles, F-06921 Sophia-Antipolis Cedex, France, vol. RAN WG2, No. Online, 20210125-20210205 Jan. 15, 2021, XP051973836, pp. 1-2, Chapter 2, Discussion.

LG Electronics Inc: "Considerations of CPAC in Rel-17", 3GPP TSG-RAN WG2 Meeting #112-e, R2-2010282 (Revision of R2-2007985), 3rd Generation Partnership Project, Mobile Competence Centre, 650, Route Des Lucioles, F-06921 Sophia-Antipolis Cedex, France, vol. RAN WG2, No. Online, 20201102-20201113 Oct. 23, 2020, XP051942962, pp. 1-3, Chapter 2.3 Enhanced SCG Failure Information.

Potevio: "Considerations on Failure Handling for CPAC in NR", 3GPP TSG-RAN WG2 Meeting #108, R2-1915915, 3rd Generation Partnership Project, Mobile Competence Centre, 650, Route Des Lucioles, F-06921 Sophia-Antipolis Cedex, France, vol. RAN WG2, No. Reno, USA, 20191118-20191122 Nov. 8, 2019, XP051817484, pp. 1-3, Chapter 2.1 SCG Failure Handling when CPAC is Configured Chapter 2.2 CPAC Failure Handling in NR.

* cited by examiner

CONDITIONAL PRIMARY SECONDARY CELL ADDITION OR CHANGE RECOVERY PROCEDURE

CROSS-REFERENCE TO RELATED APPLICATION

This Patent Application claims priority to U.S. Provisional Patent Application No. 63/186,600, filed on May 10, 2021, entitled "CONDITIONAL PRIMARY SECONDARY CELL ADDITION OR CHANGE RECOVERY PROCEDURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a conditional primary secondary cell (PSCell) addition or change recovery procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a primary cell or a primary secondary cell (PSCell), configuration information for a conditional PSCell addition or change (CPAC), the configuration information indicating configurations for one or more candidate PSCells; detect a failure, associated with the CPAC, associated with a first target PSCell among the one or more candidate PSCells; and perform an action to recover the CPAC based at least in part on detecting the failure, wherein the action is based at least in part on at least one of: a first one or more measurement values associated with the one or more candidate PSCells performed by the UE prior to detecting the failure, or a second one or more measurement values associated with the one or more candidate PSCells performed by the UE after detecting the failure.

In some aspects, a network entity for wireless communication includes a memory and one or more processors, coupled to the memory, configured to: transmit, to a UE, configuration information for a CPAC, the configuration information indicating configurations for one or more candidate PSCells and information associated with a recovery procedure for the CPAC; and receive a message associated with a recovery of the CPAC after an initial failure associated with the CPAC.

In some aspects, a method of wireless communication performed by a UE includes receiving, from a primary cell or a PSCell, configuration information for a CPAC, the configuration information indicating configurations for one or more candidate PSCells; detecting a failure, associated with the CPAC, associated with a first target PSCell among the one or more candidate PSCells; and performing an action to recover the CPAC based at least in part on detecting the failure, wherein the action is based at least in part on at least one of: a first one or more measurement values associated with the one or more candidate PSCells performed by the UE prior to detecting the failure, or a second one or more measurement values associated with the one or more candidate PSCells performed by the UE after detecting the failure.

In some aspects, a method of wireless communication performed by a network entity includes transmitting, to a UE, configuration information for a CPAC, the configuration information indicating configurations for one or more candidate PSCells and information associated with a recovery procedure for the CPAC; and receiving a message associated with a recovery of the CPAC after an initial failure associated with the CPAC.

In some aspects, a non-transitory computer-readable medium storing a set of instructions for wireless communication includes one or more instructions that, when executed by one or more processors of a UE, cause the UE to: receive, from a primary cell or a PSCell, configuration information for a CPAC, the configuration information indicating configurations for one or more candidate PSCells; detect a failure, associated with the CPAC, associated with a first target PSCell among the one or more candidate PSCells; and perform an action to recover the CPAC based at least in part on detecting the failure, wherein the action is based at least in part on at least one of: a first one or more measurement values associated with the one or more candidate PSCells performed by the UE prior to detecting the failure, or a second one or more measurement values associated with the one or more candidate PSCells performed by the UE after detecting the failure.

In some aspects, a non-transitory computer-readable medium storing a set of instructions for wireless communication includes one or more instructions that, when executed by one or more processors of a network entity, cause the network entity to: transmit, to a UE, configuration information for a CPAC, the configuration information indicating configurations for one or more candidate PSCells and information associated with a recovery procedure for the CPAC; and receive a message associated with a recovery of the CPAC after an initial failure associated with the CPAC.

In some aspects, an apparatus for wireless communication includes means for receiving, from a primary cell or a PSCell, configuration information for a CPAC, the configuration information indicating configurations for one or more candidate PSCells; means for detecting a failure, associated with the CPAC, associated with a first target PSCell among the one or more candidate PSCells; and means for performing an action to recover the CPAC based at least in part on detecting the failure, wherein the action is based at least in part on at least one of: a first one or more measurement values associated with the one or more candidate PSCells performed by the apparatus prior to detecting the failure, or a second one or more measurement values associated with the one or more candidate PSCells performed by the apparatus after detecting the failure.

In some aspects, an apparatus for wireless communication includes means for transmitting, to a UE, configuration information for a CPAC, the configuration information indicating configurations for one or more candidate PSCells and information associated with a recovery procedure for the CPAC; and means for receiving a message associated with a recovery of the CPAC after an initial failure associated with the CPAC.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
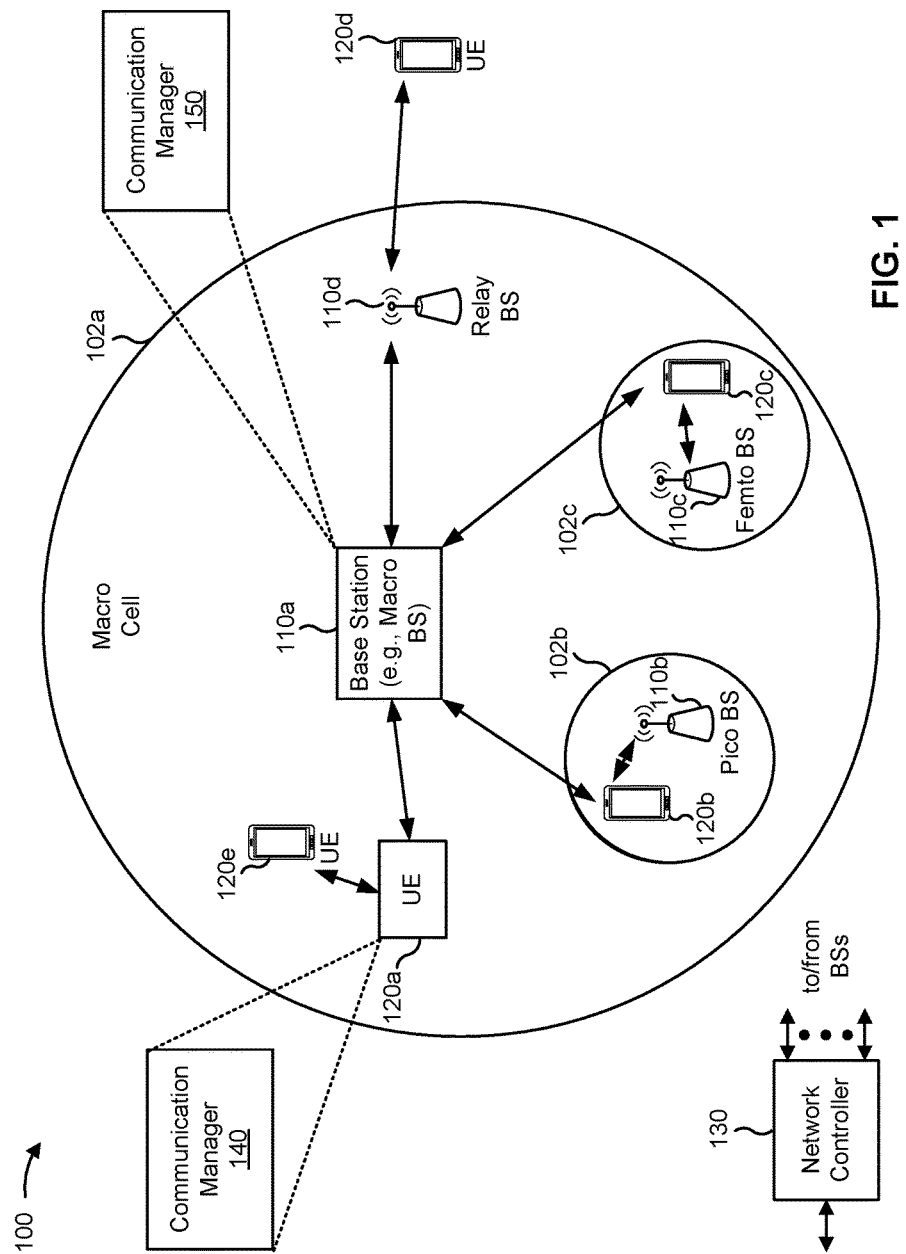
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (for example, the base station 110) or "network entity" may refer to an aggregated base station, a disaggregated base station, an integrated access and backhaul (IAB) node, a relay node, or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as narrowband IoT (NB-IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a primary cell or a primary secondary cell (PSCell), configuration information for a conditional PSCell addition or change (CPAC), the configuration information indicating configurations for one or more candidate PSCells; detect a failure, associated with the CPAC, associated with a first target PSCell among the one or more candidate PSCells; and/or perform an action to recover the CPAC based at least in part on detecting the failure, wherein the action is based at least in part on at least one of: a first one or more measurement values associated with the one or more candidate PSCells performed by the UE prior to detecting the failure, or a second one or more measurement values associated with the one or more candidate PSCells performed by the UE after detecting the failure. Additionally, or alternatively, the communication manager 140 may perform one or more other operations described herein.

In some aspects, a network entity (shown as the base station 110 in FIGS. 1 and 2 as an example) may include a communication manager 150. As described in more detail elsewhere herein, the communication manager 150 may transmit, to a UE, configuration information for a CPAC, the configuration information indicating configurations for one or more candidate PSCells and information associated with a recovery procedure for the CPAC; and/or receive a message associated with a recovery of the CPAC after an initial failure associated with the CPAC. Additionally, or alternatively, the communication manager 150 may perform one or more other operations described herein.

As indicated above, FIG. 1 is provided as an example. Other examples may differ from what is described with regard to FIG. 1.

Figure 2:
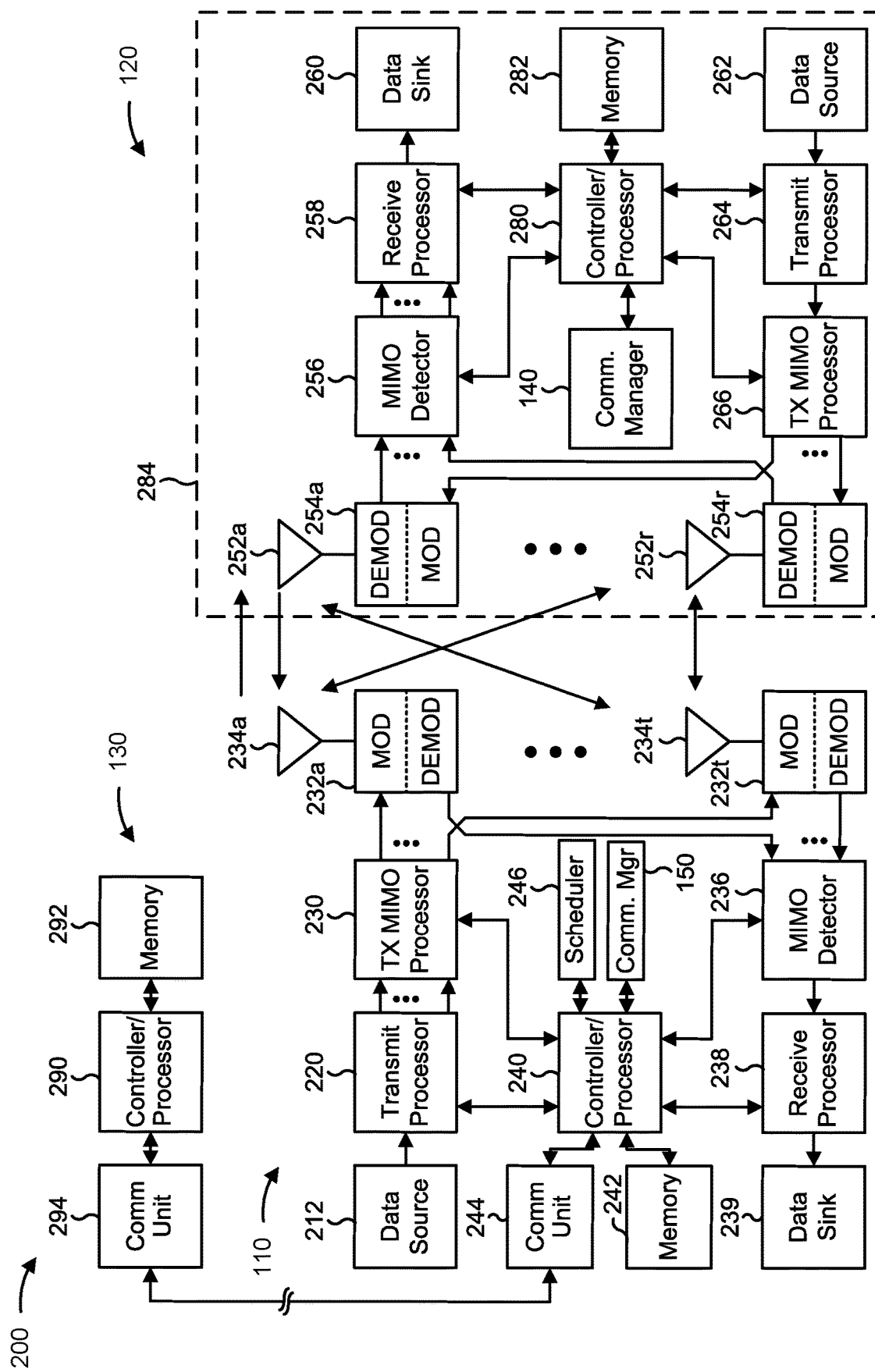
FIG. 2 is a diagram illustrating an example of a base station in communication with a user equipment (UE) in a wireless network, in accordance with the present disclosure.

FIG. 2 is a diagram illustrating an example 200 of a network entity (shown in FIG. 2 as a base station 110 as an example) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r, For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A, 7B, 8, 9, 10, and 11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A, 7B, 8, 9, 10, and 11).

The controller/processor 240 of the base station 110, the controller/processor 280 of the UE 120, and/or any other component(s) of FIG. 2 may perform one or more techniques associated with a CPAC recovery procedure, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a primary cell or a PSCell, configuration information for a CPAC, the configuration information indicating configurations for one or more candidate PSCells; means for detecting a failure, associated with the CPAC, associated with a first target PSCell among the one or more candidate PSCells; and/or means for performing an action to recover the CPAC based at least in part on detecting the failure, wherein the action is based at least in part on at least one of: a first one or more measurement values associated with the one or more candidate PSCells performed by the UE prior to detecting the failure, or a second one or more measurement values associated with the one or more candidate PSCells performed by the UE after detecting the failure. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a network entity includes means for transmitting, to a UE, configuration information for a CPAC, the configuration information indicating configurations for one or more candidate PSCells and information associated with a recovery procedure for the CPAC; and/or means for receiving a message associated with a recovery of the CPAC after an initial failure associated with the CPAC. The means for the network entity to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 3:
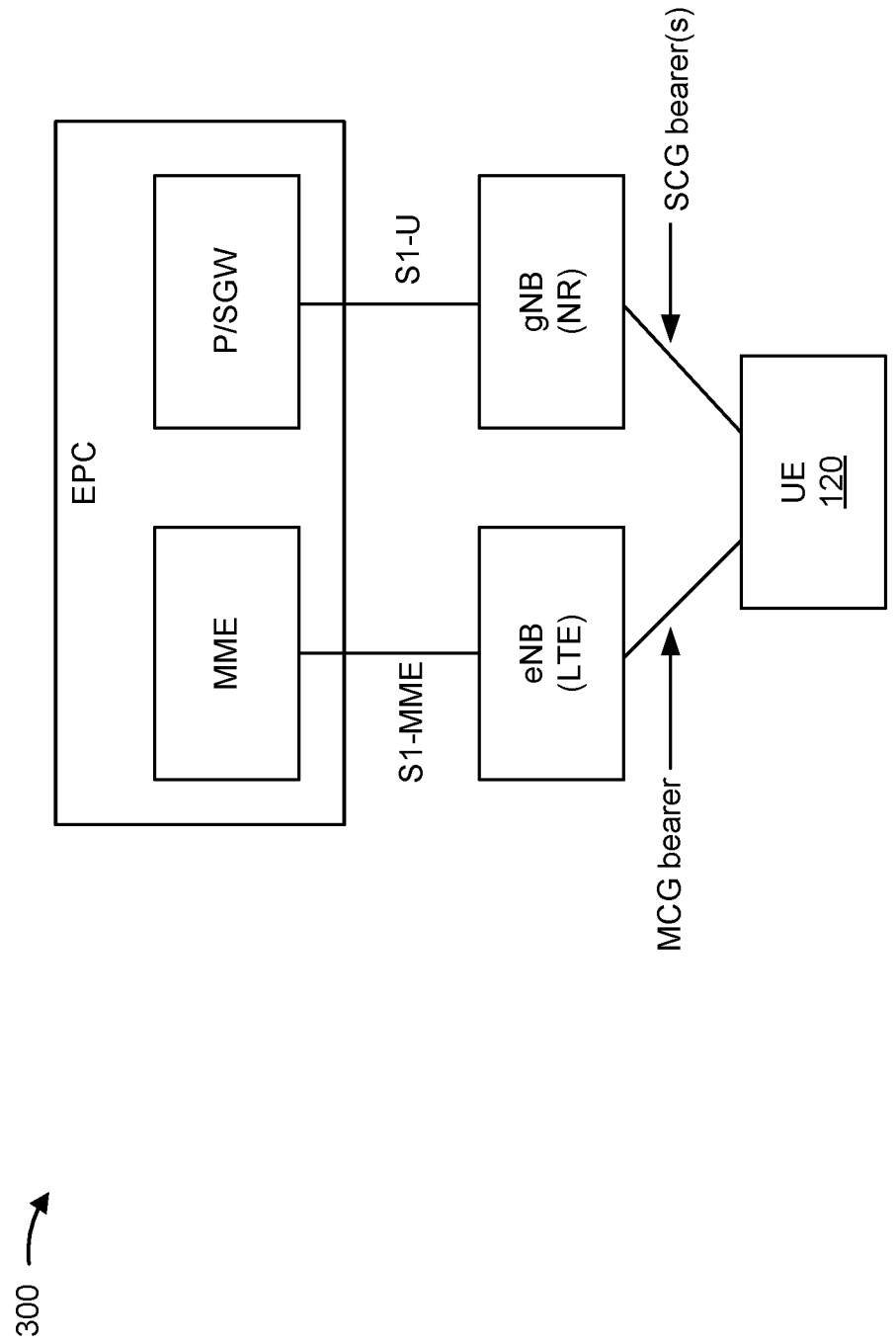
FIG. 3 is a diagram illustrating an example of dual connectivity, in accordance with the present disclosure.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

In some cases, the UE 120 may be configured with a primary carrier or a primary cell (PCell) and one or more secondary carriers or one or more secondary cells (SCells), such as when carrier aggregation is configured for the UE 120. In some examples, the primary carrier or the PCell may carry control information (e.g., downlink control information and/or scheduling information) for scheduling data communications on one or more secondary carriers, which may be referred to as cross-carrier scheduling. In some examples, a carrier (e.g., a primary carrier or a secondary carrier) may carry control information for scheduling data communications on the carrier, which may be referred to as self-carrier scheduling or carrier self-scheduling. For example, the MCG may be associated with a PCell and the SCG may be associated with one or more SCells. In some examples, the SCG may be associated with a PSCell. The PSCell may be an SCell of the SCG that the UE 120 uses for initial access with the SCG. In some examples, the PSCell may be an SCell of the SCG that is configured with a control channel for the UE 120 (e.g., a physical uplink control channel (PUCCH)) and/or an SCell of the SCG with which the UE 120 has performed a random access channel (RACH) procedure to establish a connection with the SCG. In some examples, feedback for a downlink channel of the SCG may be transmitted by the UE 120 to the PSCell (e.g., rather than other SCells of the SCG).

As indicated above, FIG. 3 is provided as an example. Other examples may differ from what is described with respect to FIG. 3.

Figure 4:
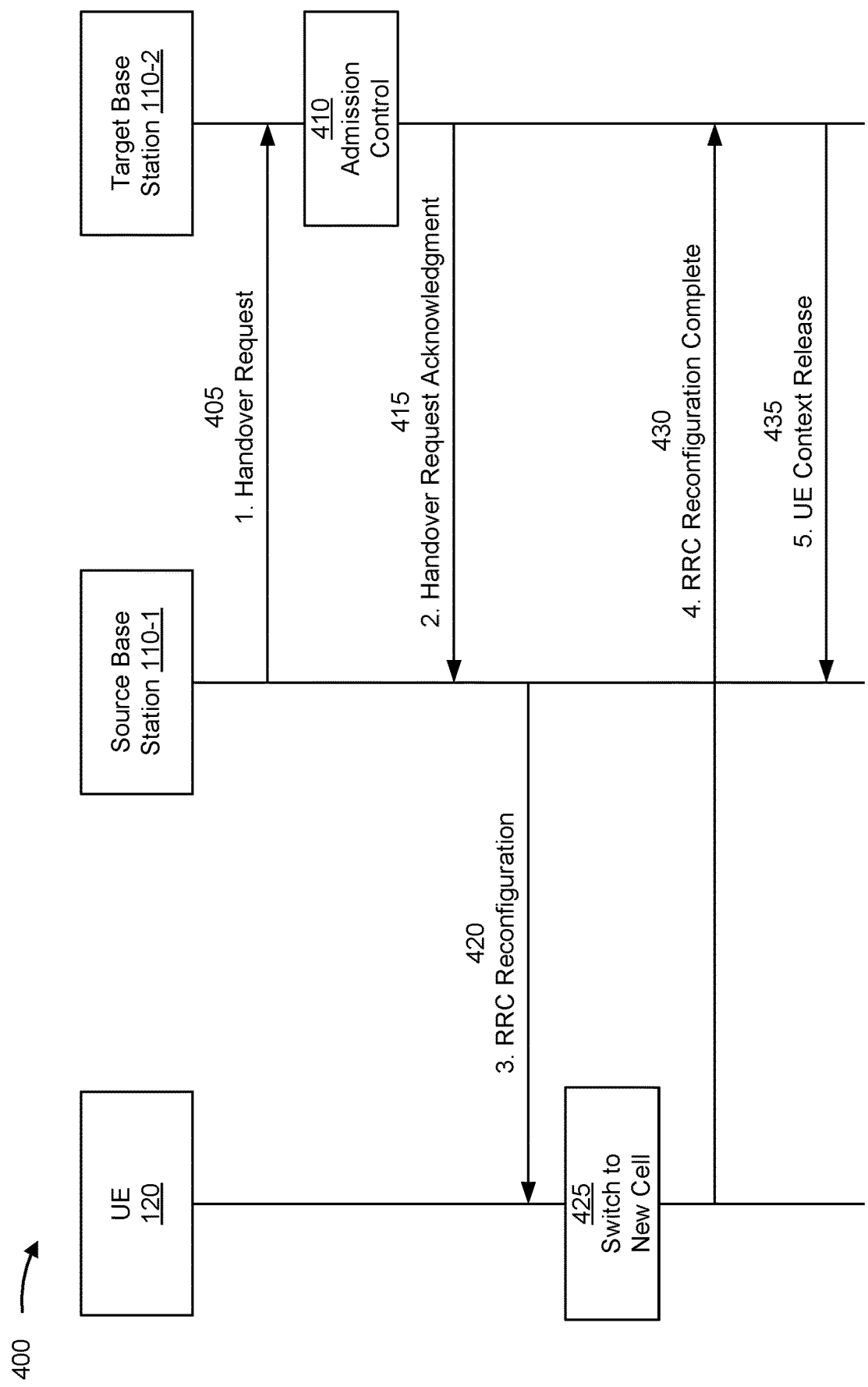
FIG. 4 is a diagram illustrating an example of a handover procedure, in accordance with the present disclosure.

FIG. 4 is a diagram illustrating an example 400 of a handover procedure, in accordance with the present disclosure. The handover procedure may be performed by a UE 120, a source base station 110-1, and a target base station 110-2. In some examples, the source base station 110-1 may be associated with a PCell and the target base station 110-2 may be associated with a target cell to replace the source base station 110-1 as the PCell for an MCG. In some other examples, the source base station 110-1 may be associated with a PSCell and the target base station 110-2 may be a target cell to replace the source base station 110-1 as the PSCell for an SCG.

As shown in FIG. 4, and by reference number 405, the source base station 110-1 may initiate handover of the UE 120 to the target base station 110-2 by transmitting a handover request message to the target base station 110-2. The source base station 110-1 may transmit the handover request message to the target base station 110-2 over an Xn, X2, or a next generation application protocol (NGAP) interface, among other examples. As shown by reference number 410, the target base station 110-2 may perform admission control procedures associated with the handover based at least in part on receiving the handover request message. As shown by reference number 415, the target base station 110-2 may transmit a handover request acknowledgment message to the source base station 110-1 (e.g., if the admission control procedures indicate that the target base station 110-2 can accept the handover of the UE 120). The handover request acknowledgment message may include an RRC configuration for connection to the target base station 110-2.

As shown by reference number 420, the source base station 110-1 may transmit the RRC configuration message, e.g., in an RRC reconfiguration message, to the UE 120 by forwarding the RRC configuration of the handover request acknowledgment message to the UE 120. As shown by reference number 425, the UE 120 may change an RRC connection from the source base station 110-1 to the target base station 110-2 based at least in part on the RRC configuration. As shown by reference number 430, the UE 120 may transmit an RRC reconfiguration complete message to the target base station 110-2. The RRC reconfiguration complete message may indicate that the UE 120 has changed the RRC connection from the source base station 110-1 to the target base station 110-2. As shown by reference number 435, the target base station 110-2 may transmit a UE context release message to the source base station 110-1. The UE context release message may indicate that the handover of the UE 120 to the target base station 110-2 was successful.

In some examples, the UE 120 may be unable to successfully connect with the target base station 110-2. For example, the UE 120 may attempt to connect with the target base station 110-2 (e.g., by performing a RACH procedure with the target base station 110-2), but the attempt to connect with the target base station 110-2 may fail. If the UE 120 is unable to successfully connect with the target base station 110-2, then the UE 120 may perform a connection re-establishment procedure to (re-)establish a connection with the source base station 110-1 or another base station 110. For example, the UE 120 may transmit an RRC re-establishment request message to the network (e.g., to the source base station 110-1 or another network entity). Additionally, the UE 120 may reset a medium access control (MAC) entity of the UE 120, release the RRC configuration for the handover procedure, suspend all radio bearers (except SRB0, in some examples), release a connection with any configured SCells, and/or release all other configurations stored by the UE 120, among other examples. Therefore, the UE 120 may (re-)establish an RRC connection (e.g., with the source base station 110-1 or another base station 110) in the event that the handover procedure with the target base station 110-2 fails.

As indicated above, FIG. 4 is provided as an example. Other examples may differ from what is described with respect to FIG. 4.

Figure 5:
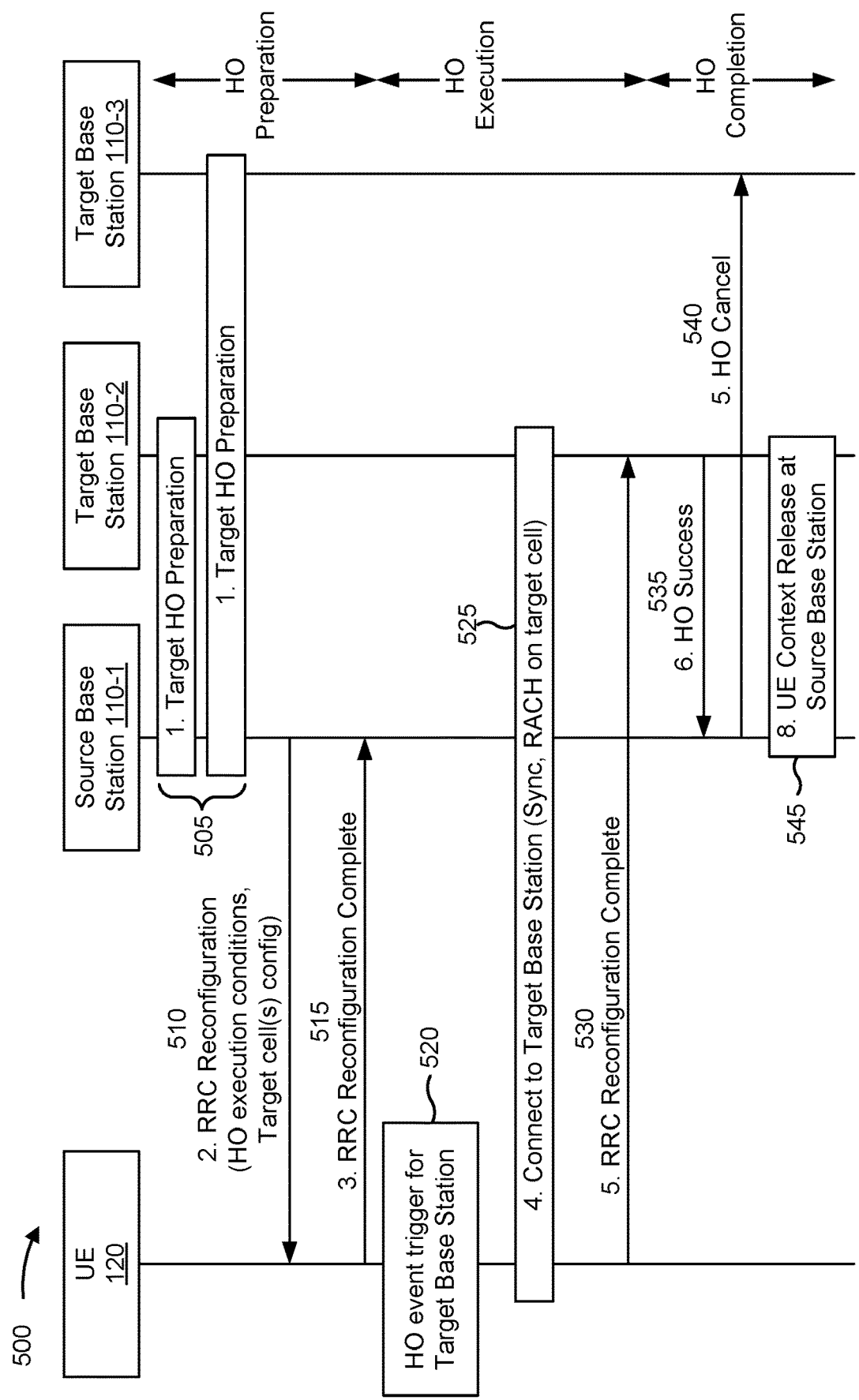
FIG. 5 is a diagram illustrating an example of a conditional handover procedure, in accordance with the present disclosure.

FIG. 5 is a diagram illustrating an example 500 of a conditional handover procedure, in accordance with the present disclosure. The conditional handover procedure may be performed by a UE 120, a source base station 110-1, and one or more target base stations 110-2, and 110-3. In some examples, the source base station 110-1 may be associated with a PCell and the target base stations 110-2, and 110-3 may be associated with a target cell to replace the source base station 110-1 as the PCell for an MCG.

As shown in FIG. 5, and by reference number 505, the source base station 110-1 may communicate with a first target base station 110-2 and a second target base station 110-3 to prepare the first and second target base stations 110-2, 110-3 for a conditional handover of the UE 120. For example, the source base station 110-1 may transmit a handover request message to the first target base station 110-2 and/or the second target base station 110-3, and the first target base station 110-2 and/or the second target base station 110-3 may transmit a handover request acknowledgment message to the source base station 110-1, as described above in connection with FIG. 4. As shown by reference number 510, the source base station 110-1 may transmit an RRC reconfiguration message to the UE 120. The RRC reconfiguration message may include a conditional handover configuration that indicates configurations for the candidate target base stations 110-2, 110-3, indicates one or more criteria (e.g., conditional thresholds) that trigger handover, among other examples. As shown by reference number 515, the UE 120 may transmit an RRC reconfiguration complete message to the source base station 110-1, which may indicate that the UE 120 has applied the RRC reconfiguration (e.g., the conditional handover configuration).

As shown by reference number 520, the UE 120 may detect a conditional handover event for the first target base station 110-2. For example, the UE 120 may determine that the one or more criteria for triggering handover to the first target base station 110-2 are satisfied. As shown by reference number 525, the UE 120 may change an RRC connection from the source base station 110-1 to the first target base station 110-2, as described above in connection with FIG. 4, based at least in part on detecting the conditional handover event for the first target base station 110-2. That is, the UE 120 may execute the handover upon detecting the conditional handover event, and not wait for an additional RRC reconfiguration message from the source base station 110-1. This may reduce handover latency.

As shown by reference number 530, the UE 120 may transmit an RRC reconfiguration complete message to the first target base station 110-2. The RRC reconfiguration complete message may indicate that the UE 120 has changed an RRC connection from the source base station 110-1 to the first target base station 110-2, as described above in connection with FIG. 4. As shown by reference number 535, the first target base station 110-2 may transmit a handover success message (e.g., indicating successful handover of the UE 120) to the source base station 110-1. As shown by reference number 540, the source base station 110-1 may transmit a handover cancel message to the second target base station 110-2. The handover cancel message may indicate that the second target base station 110-2 is to discard a handover request message (e.g., described in connection with reference number 505). As shown by reference number 545, the source base station 110-1 and the first target base station 110-2 may perform a UE context release procedure to release the UE 120 context at the source base station 110-1.

In a similar manner as described above, in connection with FIG. 4, the UE 120 may be unable to establish a connection with the first target base station 110-2. For example, the handover procedure with the first target base station 110-2 may fail. In some examples, the UE 120 may attempt to perform a RACH procedure with the first target base station 110-2, but the RACH procedure may be unsuccessful. In other words, in some cases, execution of the handover procedure with the first target base station 110-2 may fail. In some examples, rather than releasing one or more (or all) RRC configurations at the UE 120 when the handover procedure with the first target base station 110-2 fails, the UE 120 may maintain the conditional handover configuration. This may enable the UE 120 to continue to search for and/or measure candidate target base stations indicated by the conditional handover configuration. For example, the UE 120 may detect a conditional handover event for the second target base station 110-3. For example, the UE 120 may determine that the one or more criteria for triggering handover to the second target base station 110-3 are satisfied (e.g., after the handover attempt with the first target base station 110-2 fails). As the UE 120 has not released the conditional handover configuration, the UE 120 may change an RRC connection from the source base station 110-1 to the second target base station 110-3, as described above in connection with FIG. 4, based at least in part on detecting the conditional handover event for the second target base station 110-3. That is, the UE 120 may execute the handover upon detecting the conditional handover event, and not wait for an additional RRC reconfiguration message from the source base station 110-1. Moreover, the UE 120 may not wait for an additional conditional handover reconfiguration after the handover attempt with the first target base station 110-2 fails. This may reduce handover latency associated with conditional handovers.

As indicated above, FIG. 5 is provided as an example. Other examples may differ from what is described with respect to FIG. 5.

Figure 6:
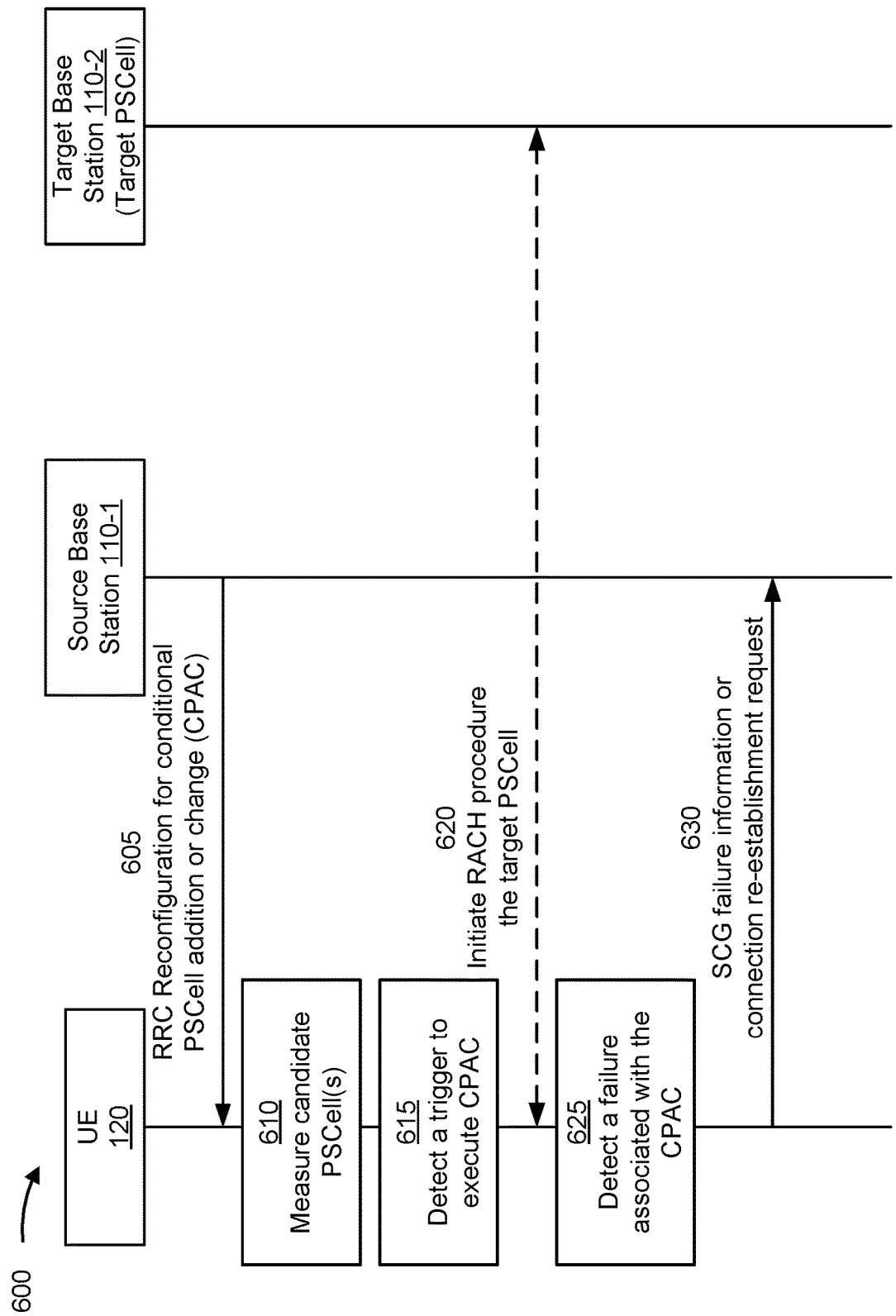
FIG. 6 is a diagram illustrating an example of a conditional primary secondary cell (PSCell) addition or change (CPAC) procedure, in accordance with the present disclosure.

FIG. 6 is a diagram illustrating an example 600 of a CPAC procedure, in accordance with the present disclosure. The CPAC procedure may be performed by a UE 120, a source base station 110-1, and a target base station 110-2. In some examples, the source base station 110-1 may be associated with a PCell and the target base station 110-2 may be a target cell to be added as, or to replace, a PSCell for an SCG associated with the UE 120.

A CPAC procedure may include a conditional PSCell addition (CPA) procedure and/or a conditional PSCell change (CPC) procedure. For example, a CPA procedure may be associated with an addition of a PSCell from one or more candidate PSCells configured by the source base station 110-1. A CPC procedure may be associated with a change in a PSCell from a current serving PSCell (not shown in FIG. 6) to a different PSCell from one or more candidate PSCells configured by the source base station 110-1.

For example, as shown by reference number 605, the source base station 110-1 may transmit an RRC reconfiguration message to the UE 120. The RRC reconfiguration message may include a CPAC configuration that indicates configurations (e.g., MAC configurations, radio bearer configurations, or other configurations) for one or more candidate PSCells (such as the target base station 110-2) and/or indicates one or more criteria (e.g., conditional thresholds) that trigger a PSCell addition or change, among other examples. The UE 120 may transmit an RRC reconfiguration complete message (not shown in FIG. 6) to the source base station 110-1, which may indicate that the UE 120 has applied the RRC reconfiguration (e.g., the CPAC configuration).

As shown by reference number 610, the UE 120 may perform one or more measurements of cells to determine corresponding measurement values. For example, the UE 120 may measure a signal strength (e.g., an RSRP) and/or a signal quality (e.g., an RSRQ) of one or more cells. In some examples, the UE 120 may measure the one or more cells in accordance with the CPAC configuration (e.g., the UE 120 may measure one or more candidate PSCells indicated by the CPAC configuration).

As shown by reference number 615, the UE 120 may detect a trigger associated with a CPC or a CPA based on performing the measurements, as described above. For example, the UE 120 may detect an event triggering the addition of the target base station 110-2 as a PSCell. Similarly, the UE 120 may detect an event triggering a change in the current PSCell to the target base station 110-2. For example, the UE 120 may determine that the one or more criteria for triggering the addition of the target base station 110-2 as a PSCell, or changing the PSCell to the target base station 110-2, are satisfied. For example, the UE 120 may change an RRC connection from another base station 110 (not shown in FIG. 6) to the target base station 110-2, to change the PSCell to the target base station 110-2, based at least in part on detecting the trigger. That is, the UE 120 may execute the CPAC procedure upon detecting the trigger, and not wait for an additional RRC reconfiguration message from the source base station 110-1. This may reduce handover latency.

As shown by reference number 620, in some aspects, the UE 120 may initiate a RACH procedure (e.g., a two-step RACH procedure or a four-step RACH procedure) with the target base station 110-2. In some aspects, the UE 120 and the target base station 110-2 may successfully complete the RACH procedure (e.g., and establish a connection).

As shown by reference number 625, the UE 120 may detect a failure associated with the CPAC procedure. As used herein, a "failure" associated with the CPAC procedure may refer to an event or a condition that results in the UE 120 being unable to establish or maintain a connection with a target PSCell associated with the CPAC procedure. For example, in some cases, the UE 120 may receive the CPAC configuration (e.g., as described above). The UE 120 may not detect that a trigger associated with the CPAC procedure has been met or satisfied (e.g., in contrast to the operations described above in connection with reference number 615). For example, the UE 120 may not detect that a trigger associated with the CPAC has been met or satisfied within an amount of time (e.g., indicated by the CPAC configuration). Therefore, the UE 120 may detect a failure associated with the CPAC procedure. As another example, the UE 120 may detect a trigger associated with the CPAC procedure (e.g., in a similar manner described above in connection with reference number 615). However, the UE 120 may be unable to successfully complete a RACH procedure with the target base station 110-2. Therefore, the UE 120 may detect a failure associated with the CPAC procedure. As another example, the UE 120 may detect a trigger associated with the CPAC procedure (e.g., in a similar manner described above in connection with reference number 615) and may successfully complete a RACH procedure with the target base station 110-2. However, the UE 120 may experience a radio link failure associated with the target base station 110-2 (e.g., after successfully completing the RACH procedure). Therefore, the UE 120 may detect a failure associated with the CPAC procedure.

In some examples, when detecting a failure associated with the CPAC procedure, the UE 120 may still maintain a connection with a PCell and/or an MCG (such as with the source base station 110-1). For example, the UE 120 may remain in an RRC connected state with the PCell. In such examples, as shown by reference number 630, the UE 120 may transmit SCG failure information to the PCell (e.g., to the source base station 110-1) indicating information associated with the failure of the CPAC procedure. The UE 120 may stop evaluating the execution conditions (e.g., the UE 120 may stop determining whether trigger events associated with the CPAC procedure are satisfied). In other words, the UE 120 may not be required to (or expected to) continue measurements for candidate PSCell(s) for execution conditions after the transmission of the SCG failure information message. The UE 120 may release the CPAC configuration after the detection of the failure associated with the CPAC procedure or after the transmission of the SCG failure information message. For example, the UE 120 may release the CPAC configuration and may wait for a new CPAC configuration from the PCell (e.g., from the source base station 110-1) based on detecting the failure associated with the CPAC procedure.

In some examples, when detecting a failure associated with the CPAC procedure, the UE 120 may not maintain a connection with a PCell and/or an MCG (such as with the source base station 110-1). For example, the UE 120 may be in an RRC idle state or an RRC inactive state after detecting the failure associated with the CPAC procedure. In such examples, as shown by reference number 630, the UE 120 may perform a cell re-establishment procedure (e.g., as defined, or otherwise fixed, by the 3GPP, such as in 3GPP Technical Specification 38.304 Version 16.1.0). For example, the UE 120 may transmit an RRC re-establishment request message to attempt to establish an RRC connection (e.g., with a PCell). After establishing the RRC connection with a PCell (e.g., based on performing the cell re-establishment procedure), the UE 120 may transmit a radio link failure report to the PCell. The UE 120 may include SCG failure information, indicating information associated with the failure of the CPAC procedure, in the radio link failure report. In some examples, the PCell may transmit the SCG failure information and/or the radio link failure report to the previous PCell (e.g., to the source base station 110) for root cause analysis of the CPAC procedure failure.

Therefore, as described above, upon detecting a failure associated with a CPAC procedure, the UE 120 may release a CPAC configuration and may transmit SCG failure information (e.g., if the UE 120 is still in an RRC connected state with a PCell) or may perform a cell re-establishment procedure (e.g., if the UE 120 is in an RRC idle or an RRC inactive state with a PCell). As a result, the UE 120 may be required to wait for a new CPAC configuration after the detection of a failure associated with a CPAC procedure. This introduces latency associated with the addition or change of a PSCell. As a result, communication performance may be degraded as a delay may be introduced before the UE 120 can add a PSCell for improved data rates (e.g., as a PSCell may provide additional radio resources for the UE 120, a delay with adding or changing the PSCell may degrade communication performance of the UE 120). Moreover, as the UE 120 may maintain a connection with a PCell after a failure associated with a CPAC procedure (e.g., the UE 120 may be in an RRC connected state with the PCell) in some scenarios, and may not maintain a connection with a PCell after a failure associated with a CPAC procedure (e.g., the UE 120 may be in an RRC idle state or an RRC inactive state) in other scenarios, recovery of a CPAC procedure presents additional complexities (e.g., as compared to a recovery of a conditional handover, for example, where the UE 120 may always be in the RRC idle state or an RRC inactive state with a source base station after a failure associated with the conditional handover).

Some techniques and apparatuses described herein enable a CPAC recovery procedure. For example, rather than releasing a CPAC configuration after a failure associated with a CPAC procedure, the UE 120 may maintain the CPAC configuration and may attempt to complete the CPAC procedure. For example, the UE 120 may use previous PSCell measurements (e.g., performed prior to the failure associated with the CPAC procedure) to select another target PSCell for the CPAC procedure. In some aspects, the UE 120 may perform additional measurements of candidate PSCells after the failure associated with the CPAC procedure. The UE 120 may determine whether a selected PSCell (e.g., that has a measurement value that satisfies a condition indicated by the CPAC configuration) is indicated in the CPAC configuration. If the selected PSCell is indicated by the CPAC configuration, then the UE 120 may apply the configuration associated with the selected PSCell.

As a result, the UE 120 may be enabled to recover a CPAC procedure after a failure. For example, the UE 120 may not immediately transmit SCG failure information or perform a cell re-establishment procedure upon a failure of the CPAC. Rather, the UE 120 may be enabled to establish a connection with a PSCell, without releasing the CPAC configuration (or without receiving a new CPAC configuration or a CPAC reconfiguration). This may reduce a latency associated with the CPAC procedure and improve a communication performance of the UE 120 by enabling the UE 120 to add or change a PSCell quicker.

As indicated above, FIG. 6 is provided as an example. Other examples may differ from what is described with respect to FIG. 6.

Figure 7A:
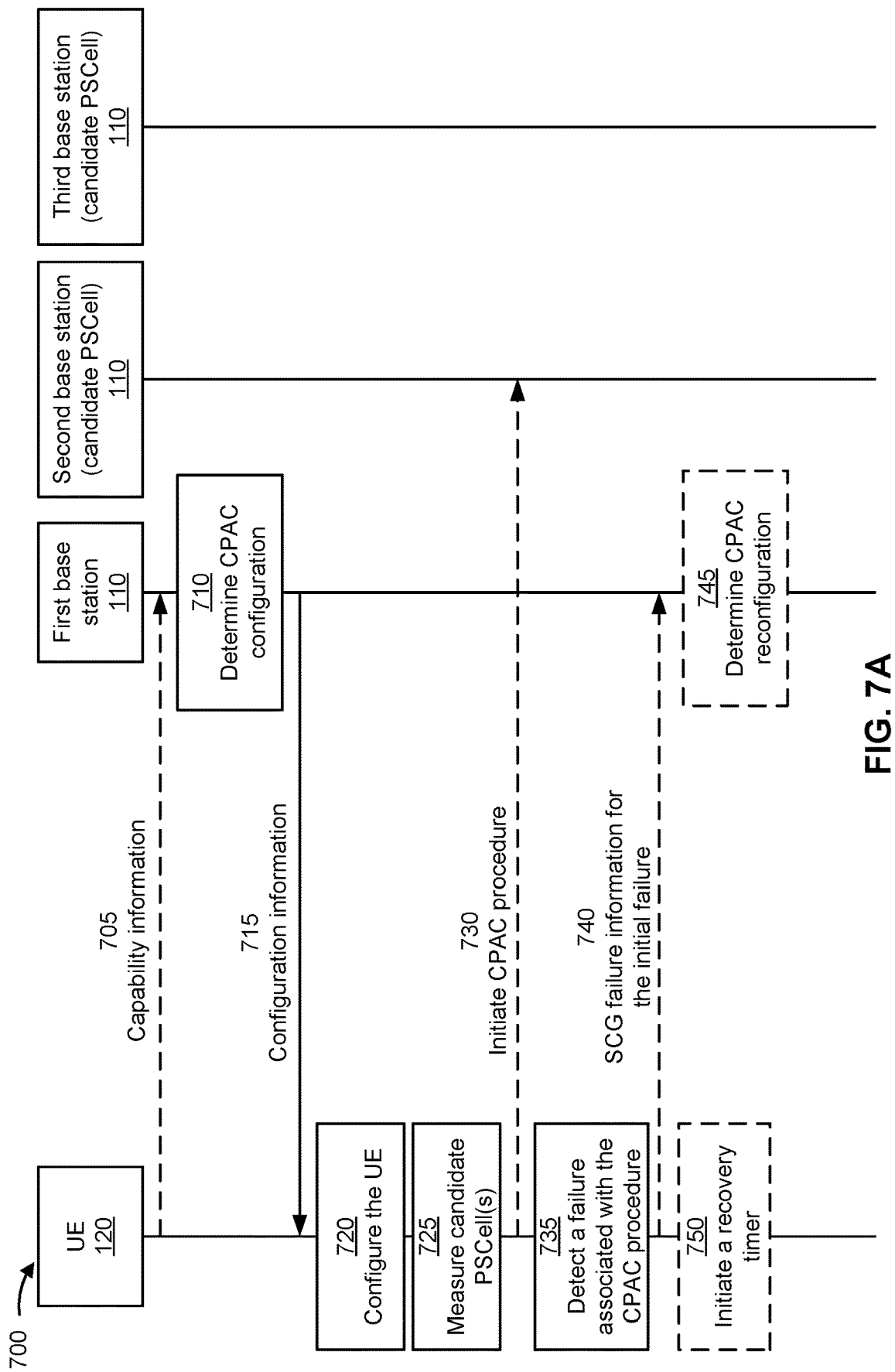
FIGS. 7A and 7B are diagrams illustrating an example associated with a CPAC recovery procedure, in accordance with the present disclosure.
Figure 7B:
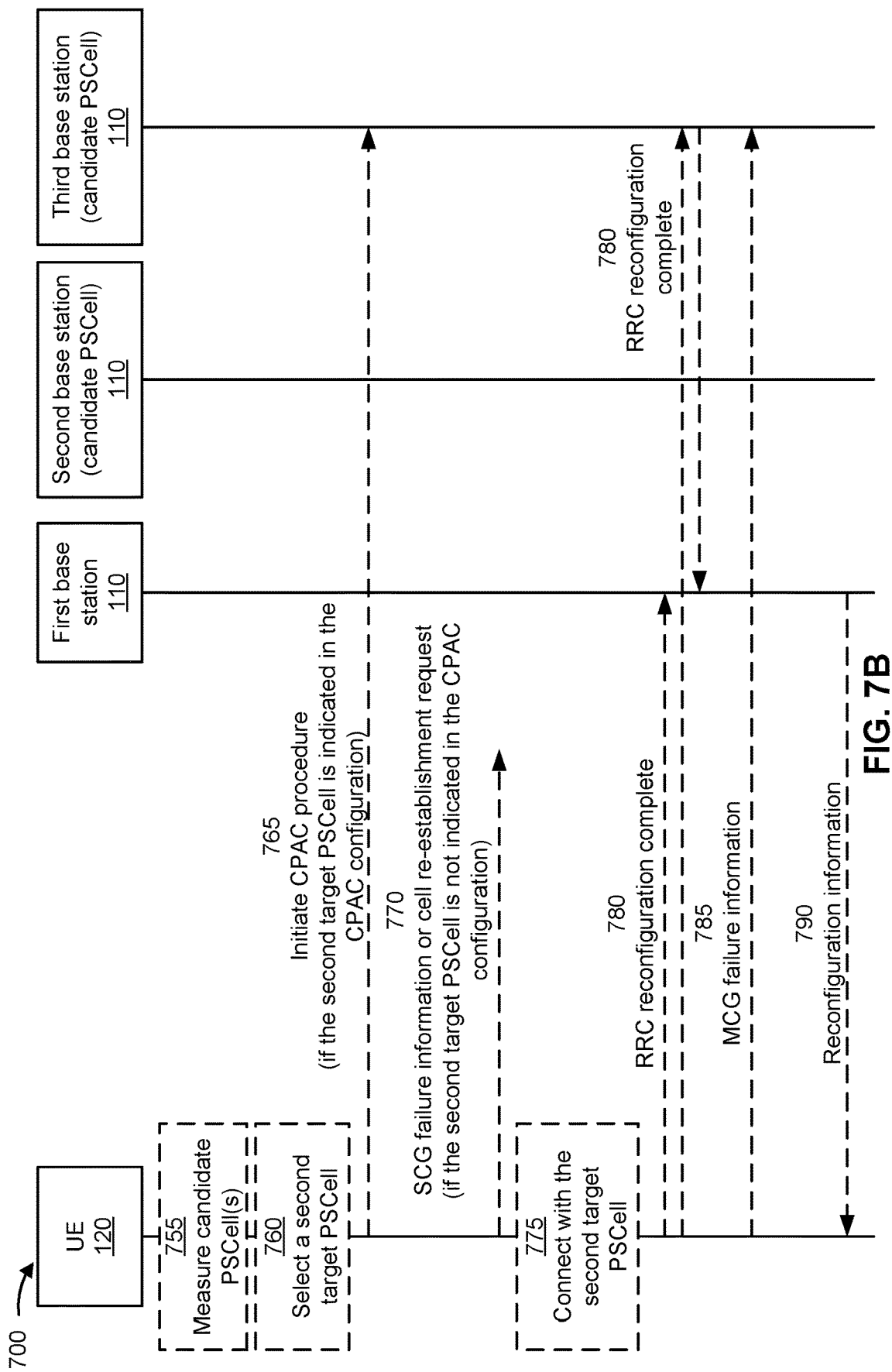

FIGS. 7A and 7B are diagrams illustrating an example 700 associated with a CPAC recovery procedure, in accordance with the present disclosure. As shown in FIGS. 7A and 7B, a first network entity (e.g., shown and described herein as a first base station 110 as an example) may communicate with a UE (e.g., UE 120). In some aspects, the first base station 110 and the UE 120 may be part of a wireless network (e.g., wireless network 100). Additionally, as shown in FIGS. 7A and 7B, the wireless network may include a second network entity and a third network entity (e.g., shown and described herein as a second base station 110 and a third base station 110, respectively). The first base station 110 may be associated with a PCell or a serving PSCell and the second base station 110 and/or the third base station 110 may be associated with candidate or target PSCells. As shown in FIGS. 7A and 7B, the UE 120 may apply a CPAC recovery procedure after a failure associated with the CPAC procedure is detected.

As used herein, "CPAC recovery procedure" may refer to one or more actions (e.g., to be performed by the UE 120) to attempt to establish a connection with a PSCell after a failure (e.g., an initial failure) of a CPAC procedure. For example, a CPAC recovery procedure may include one or more actions (e.g., to be performed by the UE 120) to attempt to establish a connection with a PSCell after a failure (e.g., an initial failure) of a CPAC procedure without receiving a new CPAC configuration or without receiving a reconfiguration of a CPAC configuration (e.g., from the first base station 110). In other words, a CPAC recovery procedure may include one or more actions (e.g., to be performed by the UE 120) to attempt to establish a connection with a PSCell after a failure (e.g., an initial failure) of a CPAC procedure based one (e.g., using the initially received CPAC configuration). The one or more actions associated with the CPAC recovery procedure are described in more detail elsewhere herein.

As shown in FIG. 7A, and by reference number 705, in some aspects, the UE 120 may transmit, and the first base station 110 may receive, capability information (e.g., UE support information). For example, the UE 120 may transmit an indication of a UE capability (e.g., UE support) associated with a CPAC recovery procedure. For example, the UE 120 may transmit, and the first base station 110 may receive, capability information indicating whether the UE 120 supports a recovery procedure associated with the CPAC. In some aspects, the UE 120 may transmit, and the first base station 110 may receive, capability information indicating whether the UE 120 supports a recovery procedure associated with the CPAC after reporting secondary cell group failure information associated with an initial failure of the CPAC. For example, the UE 120 may indicate whether the UE 120 supports transmitting SCG failure information associated with an initial (e.g., first) failure of a CPAC procedure and continuing with a CPAC recovery procedure (e.g., as described in more detail below) after transmitting the SCG failure information. For example, the UE 120 may transmit, and the first base station 110 may receive, capability information indicating whether the UE 120 supports reporting secondary cell group failure information associated with an initial failure of the CPAC.

As shown by reference number 710, the first base station 110 may determine CPAC configuration information. For example, the first base station 110 may determine configurations associated with one or more candidate PSCells (e.g., configurations associated with the second base station 110 and/or the third base station 110). The configurations may include MAC layer configurations, radio bearer configurations, and/or other configurations. For example, the first base station 110 may exchange one or more messages (such as conditional handover request messages and/or acknowledgment messages) with the one or more candidate PSCells.

In some aspects, the first base station 110 may determine that the CPAC configuration information is to include information associated with a CPAC recovery procedure. For example, the information associated with the CPAC recovery procedure may indicate one or more steps, one or more actions, and/or one or more operations to be performed by the UE 120 after the UE 120 detects a failure associated with a CPAC procedure (e.g., as described in more detail elsewhere herein).

In some aspects, the first base station 110 may determine that the CPAC configuration information is to include information associated with a CPAC recovery procedure based at least in part on the capability information transmitted by the UE 120. For example, if the UE 120 transmits capability information indicating that the UE 120 supports a recovery procedure associated with the CPAC procedure, then the first base station 110 may determine that the configuration information is to indicate that the CPAC recovery procedure is supported (or is to be performed) for the CPAC procedure. Similarly, if the UE 120 transmits capability information indicating whether the UE 120 supports reporting secondary cell group failure information associated with an initial failure of the CPAC procedure, then the first base station 110 may determine that the configuration information is to indicate that secondary cell group failure information, associated with initial failures of the CPAC procedure, is to be reported by the UE 120.

As shown by reference number 715, the first base station 110 may transmit, and the UE 120 may receive, configuration information. In some aspects, the UE 120 may receive the configuration information via one or more of RRC signaling, MAC control elements (MAC-CEs), and/or downlink control information (DCI), among other examples. In some aspects, the configuration information may include an indication of one or more configuration parameters (e.g., stored by the UE 120) for selection by the UE 120, and/or explicit configuration information for the UE 120 to use to configure the UE 120, among other examples.

In some aspects, the configuration information may indicate a CPAC configuration. The CPAC configuration may indicate configurations for one or more candidate PSCells. "Candidate PSCell" may refer to a PSCell that is available to be added as a PSCell (or available to replace a current PSCell) for the UE 120. In some examples, a candidate PSCell may be a PSCell indicated by the CPAC configuration. "Target PSCell" may refer to a PSCell that has been selected, by the UE 120, to be added as a PSCell (or to replace a current PSCell) as part of a CPAC procedure. In some aspects, the configuration information may indicate information associated with a CPAC recovery procedure that is to be performed by the UE 120 if a failure associated with the CPAC procedure is detected by the UE 120. In some aspects, the configuration information may indicate that the UE 120, after detecting a failure of the CPAC procedure, is to select an additional candidate PSCell for the CPAC procedure based at least in part on measurements (e.g., of one or more candidate PSCells) performed prior to the failure of the CPAC procedure. In some aspects, the configuration information may indicate that the UE 120, after detecting a failure of the CPAC procedure, is to measure candidate PSCells again (e.g., prior to selecting a new target PSCell for the CPAC procedure). The configuration information may indicate that the UE 120 is to select the new target PSCell for the CPAC procedure based at least in part on the measurements of candidate PSCell(s) performed after the failure of the CPAC procedure. In some aspects, the configuration information may indicate that if a configuration for a selected PSCell (e.g., selected after a failure of the CPAC procedure) is included in the configuration information, then the UE 120 is to apply the configuration and complete the CPAC procedure. The configuration information may indicate that if a configuration for a selected PSCell (e.g., selected after a failure of the CPAC procedure) is not included in the configuration information, then the UE 120 is to transmit SCG failure information (e.g., if a connection with the first base station 110 is not suspended or not in an RRC idle or RRC inactive state) or perform a cell re-establishment procedure (e.g., if a connection with the first base station 110 is suspended or is in an RRC idle or an RRC inactive state).

In some aspects, the configuration information may indicate one or more actions or operations associated with the CPAC recovery procedure to be performed (e.g., by the UE 120) to recover the CPAC procedure if a connection with the first base station 110 (e.g., if a connection with a PCell or an MCG) remains connected or not suspended after the failure associated with the CPAC procedure. In some aspects, the configuration information may indicate one or more actions or operations associated with the CPAC recovery procedure to be performed (e.g., by the UE 120) to recover the CPAC procedure if a connection with the first base station 110 (e.g., if a connection with a PCell or an MCG) is lost or is suspended after the failure associated with the CPAC procedure.

As shown by reference number 720, the UE 120 may configure the UE 120 based at least in part on the configuration information. In some aspects, the UE 120 may be configured to perform one or more actions or operations described herein based at least in part on the configuration information.

As shown by reference number 725, the UE 120 may measure one or more candidate PSCells as part of the CPAC procedure. For example, the UE 120 may measure one or more parameters associated with signals transmitted by the one or more candidate PSCells. For example, the UE 120 may measure an RSRP, an RSRQ, and/or a signal-to-interference-plus-noise ratio (SINR), among other examples, of signals transmitted by the one or more candidate PSCells. In some aspects, the UE 120 may measure the one or more candidate PSCells in accordance with the CPAC configuration. For example, the CPAC configuration may indicate the one or more candidate PSCells that are to be measured by the UE 120 and/or may indicate carrier frequencies (e.g., corresponding to the one or more candidate PSCells) that are to be measured by the UE 120 (e.g., the configuration information may indicate one or more measurement objects, corresponding to the one or more candidate PSCells, that are to be measured by the UE 120).

As described in more detail elsewhere herein, the UE 120 may determine whether a condition or trigger for executing the CPAC procedure is met based at least in part on measurement values of the one or more candidate PSCells. For example, the CPAC configuration may indicate one or more threshold values. If a measurement value of a candidate PSCell satisfies a threshold value (e.g., configured by the CPAC configuration), then the UE 120 may determine that the condition or the trigger for executing the CPAC procedure is met. In other words, as part of the CPAC procedure, the UE 120 may evaluate execution conditions (e.g., conditions or triggers for executing the CPAC procedure) based at least in part on measurement values of the one or more candidate PSCells.

In some aspects, the UE 120 may determine that a condition or trigger for executing the CPAC procedure is met based at least in part on a measurement value of a candidate PSCell (such as a candidate PSCell associated with the second base station 110). For example, the UE 120 may determine that a measurement value (e.g., an RSRP value, an RSRQ value, and/or an SINR value) of a signal transmitted by the second base station 110 satisfies a threshold configured by the CPAC configuration. Alternatively, the UE 120 may determine that a condition or trigger for executing the CPAC procedure is not met based at least in part on measurement values of the one or more candidate PSCells, which may result in a failure of the CPAC procedure (e.g., as described in more detail elsewhere herein, such as in connection with reference number 735).

As shown by reference number 730, if the UE 120 determines that a condition or trigger for executing the CPAC procedure is met, then the UE 120 may initiate the CPAC procedure with the target PSCell (e.g., with the second base station 110). For example, the UE 120 may select a candidate PSCell to be the target PSCell for the CPAC procedure (e.g., based on the measurement values of the one or more candidate PSCells). In some aspects, the UE 120 may apply a configuration (e.g., an RRC configuration) associated with the target PSCell (e.g., with the second base station 110) that is indicated by the CPAC configuration. In some aspects, the UE 120 may initiate a RACH procedure (e.g., a two-step RACH procedure or a four-step RACH procedure) with the target PSCell (e.g., with the second base station 110). For example, the UE 120 may transmit, to the second base station 110, an initial message (e.g., an msgA or an msg1) of the RACH procedure.

As shown by reference number 735, the UE 120 may detect a failure, associated with the CPAC procedure, associated with a first target PSCell (e.g., the second base station 110) of the one or more candidate PSCells indicated by the CPAC configuration. As described in more detail elsewhere herein, a "failure" associated with the CPAC procedure may refer to an event or a condition that results in the UE 120 being unable to establish or maintain a connection with a target PSCell (e.g., with the second base station 110) associated with the CPAC procedure. For example, in some aspects, the UE 120 may receive the CPAC configuration, as described above. The UE 120 may not detect that a condition or trigger associated with the CPAC procedure has been met. For example, the UE 120 may determine that measurement values of the one or more candidate PSCells do not satisfy a threshold configured by the CPAC configuration. In some aspects, the UE 120 may determine that a condition or trigger associated with the CPAC procedure has not been met within an amount of time (e.g., a threshold amount of time indicated by the CPAC configuration). Therefore, the UE 120 may detect a failure associated with the CPAC procedure. As another example, the UE 120 may detect that a condition or trigger associated with executing the CPAC procedure has been met or satisfied. However, the UE 120 may be unable to successfully complete a RACH procedure with the target PSCell (e.g., with the second base station 110). Therefore, the UE 120 may detect a failure associated with the CPAC procedure. As another example, the UE 120 may detect that a condition or trigger associated with executing the CPAC procedure has been met or satisfied and may successfully complete a RACH procedure with the target PSCell (e.g., with the second base station 110). However, the UE 120 may experience a radio link failure associated with the second base station 110 (e.g., after successfully completing the RACH procedure). Therefore, the UE 120 may detect a failure associated with the CPAC procedure.

In some aspects, as shown by reference number 740, the UE 120 may transmit, and the first base station 110 (e.g., the PCell and/or the MCG) may receive, SCG failure information associated with the initial failure of the CPAC procedure. For example, as described above, the UE 120 may support transmitting SCG failure information for an initial failure of the CPAC procedure as part of the CPAC recovery procedure. The CPAC configuration (e.g., the configuration information) may configure the UE 120 to transmit SCG failure information for failures (e.g., for an initial failure and/or for each failure) associated with the CPAC procedure as part of the CPAC recovery procedure. For example, the SCG failure information may indicate information associated with the failure. For example, the SCG failure information may indicate a cause of the failure (e.g., a failure type). For example, the SCG failure information may indicate that a condition or trigger associated with the CPAC procedure was not met or satisfied. As another example, the SCG failure information may indicate that a RACH procedure associated with a target PSCell failed (e.g., and/or may identify the target PSCell, such as the second base station 110). As another example, the SCG failure information may indicate that the UE 120 experienced a radio link failure associated with a target PSCell after successfully completing a RACH procedure (e.g., and/or may identify the target PSCell, such as the second base station 110).

In some aspects, the transmission of the SCG failure information associated with the initial failure may not cause the UE 120 to suspend the CPAC procedure. For example, previously, transmission of SCG failure information may cause the UE 120 to suspend all SCG transmissions for all configured radio bearers and to release the CPAC configuration. However, the UE 120 may be enabled to maintain the CPAC configuration after transmission of the SCG failure information associated with the initial failure as part of the CPAC recovery procedure. In some aspects, the SCG failure information associated with the initial failure may include less information than other transmissions of SCG failure information. For example, the SCG failure information associated with the initial failure may indicate the cause of the failure and/or may identify the target PSCell associated with the failure, but the SCG failure information may not indicate other information that may be included in SCG failure information (such as one or more measurements, for example).

In some aspects, the SCG failure information associated with the initial failure may include an indication (e.g., a flag to indicate) that the secondary cell group failure information is associated with an initial failure of the CPAC procedure. For example, the SCG failure information associated with the initial failure may include an indication that the SCG failure information is being transmitted to the first base station 110 for the purpose of early notification of the failure associated with the CPAC procedure.

For example, the transmission of the SCG failure information associated with the initial failure may enable the first base station 110 to receive an indication of the failure earlier. As a result, the first base station 110 (e.g., the PCell and/or the MCG) may be enabled to prepare a reconfiguration of the CPAC configuration based at least in part on receiving the SCG failure information associated with the initial failure. In other words, the first base station 110 may be enabled to prepare a reconfiguration of the CPAC configuration while the UE 120 attempts to recover the CPAC procedure. This may reduce a latency associated with reconfiguring the CPAC configuration for the UE 120 in the event that the UE 120 is unable to recover the CPAC procedure.

As shown by reference number 745, the first base station 110 may determine a CPAC reconfiguration based at least in part on receiving the SCG failure information associated with the initial failure. For example, the first base station 110 may determine one or more modifications to the CPAC configuration. For example, the first base station 110 may determine one or more candidate PSCells to be removed from the CPAC configuration and/or one or more candidate PSCells to be added to the CPAC configuration.

The first base station 110 may not immediately transmit the CPAC reconfiguration (e.g., that is determined based at least in part on receiving the SCG failure information associated with the initial failure). For example, the first base station 110 may refrain from transmitting the CPAC reconfiguration until the first base station 110 receives an indication that the UE 120 has completed the CPAC recovery procedure (e.g., an indication that the UE 120 established a connection with a target PSCell or an indication that the UE 120 was unable to recover the CPAC procedure). For example, the first base station 110 may transmit the CPAC reconfiguration based at least in part on receiving, from the UE 120, a reconfiguration complete message indicating that a connection has been established with a candidate or target PSCell. In some aspects, the first base station 110 may transmit the CPAC reconfiguration based at least in part on receiving, from the UE 120, SCG failure information indicating that the CPAC procedure could not be recovered. In some aspects, the first base station 110 may transmit the CPAC reconfiguration based at least in part on an expiration of a recovery timer associated with the CPAC recovery procedure.

For example, as shown by reference number 750, the UE 120 may initiate a recovery timer based at least in part on detecting the failure associated with the CPAC procedure. The recovery timer may indicate an amount of time during which the UE 120 is to attempt to recover the CPAC procedure, as explained in more detail elsewhere herein. For example, after an expiration of the recovery timer, the UE 120 may abandon the CPAC recovery procedure if a connection with a PSCell has not been established. For example, based at least in part on an expiration of the recovery timer prior to establishing a connection with the PSCell, the UE 120 may transmit SCG failure information to the first base station 110 (e.g., if a connection with the first base station 110 is in an active or connected state). Alternatively, based at least in part on an expiration of the recovery timer prior to establishing a connection with the PSCell, the UE 120 may initiate a cell re-establishment procedure (e.g., if a connection with the first base station 110 is not in an active or connected state). In some aspects, the configuration information (e.g., the CPAC configuration) may indicate an amount of time associated with the recovery timer. For example, the UE 120 may receive an indication of an amount of time associated with the recovery timer as part of the configuration information.

As described above, the first base station 110 may initiate a recovery timer after receiving the SCG failure information associated with the initial failure of the CPAC procedure. In some aspects, an amount of time associated with the recovery timer initiated by the first base station 110 may be the same as an amount of time associated with the recovery timer initiated by the UE 120. Alternatively, an amount of time associated with the recovery timer initiated by the first base station 110 may be different than an amount of time associated with the recovery timer initiated by the UE 120. As described above, in some aspects, the first base station 110 may use the recovery timer to determine when to transmit a CPAC reconfiguration. For example, the first base station 110 may transmit the CPAC reconfiguration after receiving an indication that the CPAC recovery procedure was successful (e.g., an RRC reconfiguration complete message) or that the CPAC recovery procedure was unsuccessful (e.g., additional SCG failure information). The first base station 110 may transmit the CPAC reconfiguration based at least in part on an expiration of the recovery timer (e.g., initiated by the first base station 110) prior to receiving the indication that the CPAC recovery procedure was successful or the indication that the CPAC recovery procedure was unsuccessful.

As shown in FIG. 7B, and by reference number 755, in some aspects, the UE 120 may measure one or more PSCells to obtain second one or more measurement values associated with the one or more PSCells after the failure associated with the CPAC procedure. For example, as part of the CPAC recovery procedure, the UE 120 may measure one or more PSCells (e.g., PSCells indicated by the CPAC configuration and/or other configured PSCells) to obtain additional or new measurement values of the one or more PSCells. For example, the UE 120 may measure an RSRP, an RSRQ, and/or an SINR, among other examples, of one or more PSCells after detecting the failure associated with the CPAC procedure. Alternatively, the UE 120 may not measure one or more PSCells to obtain one or more additional measurement values (e.g., a second one or more measurement values) after the failure associated with the CPAC procedure. For example, the UE 120 may use measurement values obtained prior to the failure associated with the CPAC procedure (e.g., as described in connection with reference number 725) for the CPAC recovery procedure.

As shown by reference number 760, in some aspects, the UE 120 may select a second target PSCell for the CPAC procedure after the failure associated with the CPAC procedure. For example, the UE 120 may select a second target PSCell (e.g., a second target PSCell from the candidate PSCells) based at least in part on the one or more measurement values obtained prior to the failure associated with the CPAC procedure. For example, as described in more detail elsewhere herein, the UE 120 may detect that a condition or trigger associated with executing the CPAC procedure is met or satisfied for the first target PSCell (e.g., the second base station 110). In some aspects, the UE 120 may determine that multiple PSCells (e.g., at least one PSCell in addition to the first target PSCell) satisfy or meet a condition or trigger associated with executing the CPAC procedure (e.g., as described in connection with reference number 725 and/or 730). The UE 120 may select a second target PSCell to be the new target PSCell from the PSCells that previously satisfied or met the condition or trigger associated with executing the CPAC procedure. Alternatively, the UE 120 may determine that only the first target PSCell satisfied or met the condition or trigger associated with executing the CPAC procedure. In such examples, the UE 120 may select a candidate PSCell to be the new target PSCell that is associated with a next best measurement value (e.g., a next highest measurement value) based at least in part on the one or more measurement values obtained prior to the failure associated with the CPAC procedure.

In some aspects, as described above, after the failure associated with the CPAC procedure, the UE 120 may obtain one or more additional measurement values. In some aspects, the one or more additional measurement values may be, or include measurement values, associated with PSCells that are not indicated in the CPAC configuration (e.g., that are not indicated by the configuration information). For example, the PSCells that are not indicated in the CPAC configuration may be configured for the UE 120 in a separate configuration received from the base station 110 or another network entity. The UE 120 may select a second PSCell to be the new target PSCell based at least in part on the one or more additional measurement values. For example, the UE 120 may determine whether the one or more additional measurement values satisfy a threshold configured by the CPAC configuration. In some aspects, the threshold may be the same as a threshold associated with executing the CPAC procedure. In some other aspects, the threshold may be different than a threshold associated with executing the CPAC procedure. For example, the UE 120 may receive an indication of a threshold signal strength value (e.g., a threshold RSRP value or a threshold SINR value) or a threshold signal quality value (e.g., a threshold RSRQ value) to be used for selecting a target PSCell after a CPAC procedure failure (e.g., where the threshold for selecting a target PSCell after a CPAC procedure failure is different than a threshold for initiating the CPAC procedure).

In some aspects, the UE 120 may prioritize candidate PSCells that previously satisfied or met the condition or trigger associated with executing the CPAC procedure for selection as a target PSCell during the CPAC recovery procedure. For example, as described elsewhere herein, more than one candidate PSCell may satisfy or meet the condition or trigger associated with executing the CPAC procedure. The UE 120 may select a candidate PSCell, from the multiple candidate PSCells that satisfy or meet the condition or trigger, for the initial CPAC procedure. After the failure associated with the CPAC procedure (e.g., and the first selected candidate PSCell), the UE 120 may select a second target PSCell for the CPAC based at least in part on prioritizing a PSCell associated with a measurement value that previously satisfied or met the condition or trigger associated with executing the CPAC procedure.

In some aspects, the UE 120 may determine that no PSCells satisfy a condition or trigger associated with executing the CPAC procedure after the failure associated with the CPAC procedure. For example, the UE 120 may measure one or more PSCells (e.g., including or partly including the candidate PSCells indicated in the CPAC configuration and/or one or more PSCells which are not indicated in the CPAC configuration) to obtain one or more measurement values associated with the one or more PSCells (e.g., after the failure associated with the CPAC procedure). The UE 120 may determine that none of the one or more measurement values associated with the one or more PSCells satisfy a condition or trigger associated with executing the CPAC procedure. As a result, the UE 120 may abandon the CPAC recovery procedure as there may be no suitable PSCells with which to perform the CPAC procedure. For example, the UE 120 may transmit SCG failure information (e.g., if a connection with the first base station 110 is active or remains connected) or may transmit a message to initiate a cell re-selection procedure (e.g., if a connection with the first base station 110 is lost or suspended), as described in more detail elsewhere herein.

As shown by reference number 765, if the selected target PSCell is indicated in the CPAC configuration, then the UE 120 may initiate the CPAC procedure with the selected target PSCell (e.g., with a second target PSCell), such as with the third base station 110. For example, the UE 120 may apply a configuration (e.g., an RRC configuration) associated with the selected target PSCell (e.g., with the third base station 110) based at least in part on the configuration being indicated by the CPAC configuration. The UE 120 may initiate a RACH procedure with the selected target PSCell in an attempt to establish a connection with the selected target PSCell. For example, the UE 120 may transmit, and the third base station 110 (e.g., the selected target PSCell) may receive, an initial message of a RACH procedure.

In some aspects, alternatively, as shown by reference number 770, if the selected target PSCell is not indicated in the CPAC configuration, then the UE 120 may abandon the CPAC recovery procedure (e.g., because the UE 120 does not have a configuration for the selected target PSCell stored). For example, the UE 120 may perform measurements associated with configured PSCells in accordance with a measurement configuration of the PSCell. The UE 120 may select a target cell based at least in part on the measurements and determine whether the selected target cell is indicated by the CPAC configuration. A selected target PSCell associated with the CPAC recovery procedure may not be indicated by the CPAC configuration. For example, a configuration for the selected target PSCell may not be indicated by the CPAC configuration. For example, if a connection with the first base station 110 (e.g., with the PCell and/or the MCG) is active or remains connected, then the UE 120 may transmit SCG failure information to the first base station 110 based at least in part on a selected target PSCell (e.g., a second PSCell) not being included in the one or more candidate PSCells indicated by the configuration information (e.g., indicated by the CPAC configuration).

The SCG failure information may indicate that the CPAC recovery procedure was unsuccessful. Alternatively, if a connection with the first base station 110 (e.g., with the PCell or the MCG) is lost or suspended, then the UE 120 may initiate a cell re-establishment procedure. For example, the UE 120 may transmit a cell re-establishment request message based at least in part on the selected target PSCell (e.g., second PSCell) not being included in the one or more candidate PSCells indicated by the configuration information (e.g., indicated by the CPAC configuration). For example, because the UE 120 is unable to recover the CPAC procedure and because the UE 120 does not have an active connection with the first base station 110, the UE 120 may need to perform a cell re-establishment procedure to recover a connection with a PCell (e.g., with the first base station 110 or another base station 110 not shown in FIGS. 7A and 7B). For example, the UE 120 may perform a cell re-establishment procedure for an RRC idle state or an RRC inactive state as defined, or otherwise fixed, by a wireless communication standard, such as the 3GPP.

As shown by reference number 775, in some aspects, the UE 120 may successfully connect with the selected target PSCell as part of the CPAC recovery procedure. For example, the UE 120 may successfully complete a RACH procedure with the selected target PSCell, such as the third base station 110. For example, the UE 120 may apply a configuration associated with the selected target PSCell, such as the third base station 110, and may successfully complete a RACH procedure with the selected target PSCell. As a result, the selected target PSCell may be added as a PSCell, or the UE 120 may change a PSCell to the selected target PSCell, after the failure associated with the CPAC procedure (e.g., without receiving a reconfiguration of the CPAC configuration).

As shown by reference number 780, the UE 120 may transmit an RRC reconfiguration complete message indicating that the selected target PSCell has been successfully configured as the PSCell for the UE 120. For example, if a connection with the first base station 110 (e.g., with the PCell and/or the MCG) is active or remains connected, then the UE 120 may transmit the RRC reconfiguration complete message to the first base station 110 via the connection with the first base station 110. Alternatively, if a connection with the first base station 110 (e.g., with the PCell or the MCG) is lost or suspended, then the UE 120 may transmit, to a node (e.g., a master node, such as a radio access node that provides a control plane connection for the primary cell to the core network) associated with the primary cell (e.g., the first base station 110) and based at least in part on establishing the connection with the second PSCell (e.g., the third base station 110), a reconfiguration complete message via an SRB associated with the node. For example, the UE 120 may transmit the RRC reconfiguration complete message via SRB 3 (e.g., an SRB associated with a transfer of RRC messages between the UE 120 and a secondary cell) or via a split bearer, such as a split SRB 1 (e.g., an SRB for RRC messages and/or non-access stratum messages prior to the establishment of an SRB 2). The index value of the SRBs described above (e.g., "3" or "1") may indicate a type of SRB as defined, or otherwise fixed, by a wireless communication standard, such as the 3GPP.

In some aspects, where the RRC reconfiguration complete message is transmitted via the SRB 3, an SCell (such as the added PSCell and/or the third base station 110) may forward the RRC reconfiguration complete message to the first base station 110 (e.g., to the previous PCell). For example, the SRB 3 bearer may terminate at a secondary node or an SCell. Therefore, the secondary node or the SCell may forward the RRC reconfiguration complete message to the first base station 110 (e.g., to the previous PCell).

As shown by reference number 785, if a connection with the first base station 110 (e.g., with the PCell or the MCG) is lost or suspended, then the UE 120 may transmit MCG failure information associated with a previous PCell (e.g., associated with the first base station 110), after successfully completing the CPAC recovery procedure (e.g., after establishing a connection with the third base station 110, as described in more detail elsewhere herein). For example, the UE 120 may establish a connection with a second PSCell based at least in part on performing one or more actions associated with the CPAC recovery procedure. The UE 120 may transmit, based at least in part on establishing the connection with the second PSCell, MCG failure information associated with a previous PCell (e.g., associated with the first base station 110) to enable MCG recovery. For example, transmitting the MCG failure information may enable an MCG to be reconnected or re-established for the UE 120 faster.

In some aspects, as described in more detail elsewhere herein, the UE 120 may be unable to establish a connection with a second PSCell after the initial failure associated with the CPAC procedure. In other words, the UE 120 may be unable to recover the CPAC procedure based at least in part on performing one or more actions described herein. For example, the UE 120 may attempt to establish a connection with one or more target PSCells after the failure associated with the CPAC procedure, but may be unsuccessful in establishing a connection with a PSCell. In some aspects, a recovery timer may expire prior to the UE 120 establishing a connection with a PSCell. As a result, the UE 120 may release the CPAC configuration (e.g., may discard the CPAC configuration from a memory of the UE 120). In other words, the UE 120 may remove content associated with the CPAC configuration from a memory of the UE 120. In some aspects, where the UE 120 transmitted first SCG failure information associated with the failure of the CPAC procedure (e.g., as described in connection with reference number 740), the UE 120 may remove content associated with the first SCG failure information from a memory based at least in part on transmitting second SCG failure information (e.g., that indicates that the CPAC recovery procedure was unsuccessful).

For example, the UE 120 may transmit SCG failure information indicating that the CPAC recovery procedure was unsuccessful (e.g., if a connection with the first base station 110 (e.g., with the PCell and/or the MCG) is active or remains connected). Alternatively, the UE 120 may initiate a cell re-establishment procedure (e.g., if a connection with the first base station 110 (e.g., with the PCell or the MCG) is lost or suspended). In such examples (e.g., where a connection with the first base station 110 (e.g., with the PCell or the MCG) is lost or suspended), the UE 120 may (re-)establish a connection with a PCell (e.g., with the first base station 110 and/or with a different PCell). For example, the UE 120 may establish a connection with a second PCell (e.g., with the first base station 110 and/or with a different PCell) based at least in part on the CPAC recovery procedure being unsuccessful and/or based at least in part on an expiration of the recovery timer prior to establishing a connection with a second PSCell. The UE 120 may transmit, to the second PCell, a radio link failure report indicating information associated with the lost or suspended connection with the first base station 110. In some aspects, the UE 120 may transmit, to the second PCell, SCG failure information (e.g., associated with the CPAC procedure and/or the CPAC recovery procedure) in the radio link failure report. In some other aspects, the UE 120 may transmit, to the second PCell, SCG failure information (e.g., associated with the CPAC procedure and/or the CPAC recovery procedure) in a different report (e.g., a report associated with the CPAC procedure and/or the CPAC recovery procedure).

As shown by reference number 790, the UE 120 may receive, from the first base station 110 (or another PCell), reconfiguration information associated with the CPAC procedure. For example, the first base station 110 may transmit, and the UE 120 may receive, reconfiguration information based at least in part on: a transmission, to the primary cell, of a reconfiguration complete message indicating that a connection has been established with a second PSCell (e.g., with the third base station 110); a transmission, to the primary cell, of SCG failure information indicating that the CPAC procedure could not be recovered; and/or an expiration of a recovery timer associated with the CPAC procedure; among other examples. The reconfiguration information may indicate configurations for one or more additional PSCells and/or may remove one or more configurations for PSCells that were indicated in the configuration information.

As a result, the UE 120 may be enabled to recover a CPAC procedure after a failure. For example, the UE 120 may not immediately transmit SCG failure information or perform a cell re-establishment procedure upon a failure of the CPAC. Rather, the UE 120 may be enabled to establish a connection with another PSCell, without releasing the CPAC configuration (or without receiving a new CPAC configuration or a CPAC reconfiguration). This may reduce a latency associated with the CPAC procedure and improve a communication performance of the UE 120 by enabling the UE 120 to add or change a PSCell quicker.

As indicated above, FIGS. 7A and 7B are provided as an example. Other examples may differ from what is described with respect to FIGS. 7A and 7B.

Figure 8:
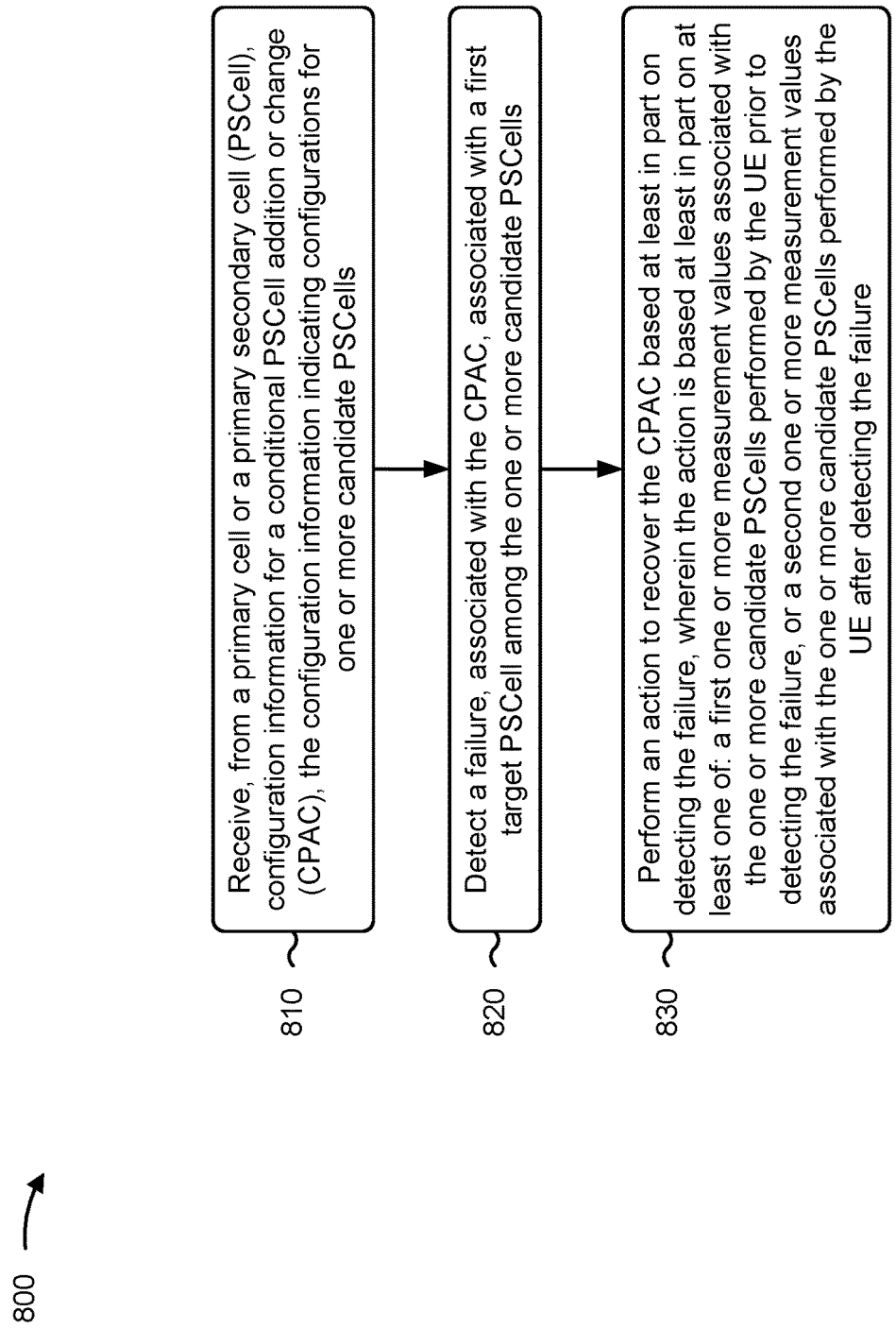
FIGS. 8 and 9 are diagrams illustrating example processes associated with a CPAC recovery procedure, in accordance with the present disclosure.

FIG. 8 is a diagram illustrating an example process 800 performed, for example, by a UE, in accordance with the present disclosure. Example process 800 is an example where the UE (e.g., UE 120) performs operations associated with a CPAC recovery procedure.

As shown in FIG. 8, in some aspects, process 800 may include receiving, from a primary cell or a PSCell, configuration information for a CPAC, the configuration information indicating configurations for one or more candidate PSCells (block 810). For example, the UE (e.g., using communication manager 140 and/or reception component 1002, depicted in FIG. 10) may receive, from a primary cell or a PSCell, configuration information for a CPAC, the configuration information indicating configurations for one or more candidate PSCells, as described above.

As further shown in FIG. 8, in some aspects, process 800 may include detecting a failure, associated with the CPAC, associated with a first target PSCell among the one or more candidate PSCells (block 820). For example, the UE (e.g., using communication manager 140 and/or detection component 1008, depicted in FIG. 10) may detect a failure, associated with the CPAC, associated with a first target PSCell among the one or more candidate PSCells, as described above.

As further shown in FIG. 8, in some aspects, process 800 may include performing an action to recover the CPAC based at least in part on detecting the failure, wherein the action is based at least in part on at least one of: a first one or more measurement values associated with the one or more candidate PSCells performed by the UE prior to detecting the failure, or a second one or more measurement values associated with the one or more candidate PSCells performed by the UE after detecting the failure (block 830). For example, the UE (e.g., using communication manager 140 and/or CPAC recovery component 1010, depicted in FIG. 10) may perform an action to recover the CPAC based at least in part on detecting the failure, wherein the action is based at least in part on at least one of: a first one or more measurement values associated with the one or more candidate PSCells performed by the UE prior to detecting the failure, or a second one or more measurement values associated with the one or more candidate PSCells performed by the UE after detecting the failure, as described above.

Process 800 may include additional aspects, such as any single aspect or any combination of aspects described below and/or in connection with one or more other processes described elsewhere herein.

In a first aspect, performing the action to recover the CPAC includes transmitting, to the primary cell, secondary cell group failure information based at least in part on none of the first one or more measurement values associated with the one or more candidate PSCells satisfying a condition associated with executing the CPAC.

In a second aspect, alone or in combination with the first aspect, receiving the configuration information for the CPAC includes receiving an indication of a threshold signal strength value or a threshold signal quality value to be used for selecting target PSCells after a CPAC failure.

In a third aspect, alone or in combination with one or more of the first and second aspects, a connection with the primary cell remains established after the failure is detected, and performing the action to recover the CPAC includes selecting a second target PSCell for the CPAC, and establishing a connection with the second target PSCell based at least in part on the configuration information indicating a configuration associated with the second target PSCell.

In a fourth aspect, alone or in combination with one or more of the first through third aspects, a connection with the primary cell remains established after the failure is detected, and performing the action to recover the CPAC includes selecting a second target PSCell for the CPAC, and transmitting, to the primary cell, secondary cell group failure information based at least in part on the second target PSCell not being included in the one or more candidate PSCells indicated by the configuration information.

In a fifth aspect, alone or in combination with one or more of the first through fourth aspects, performing the action to recover the CPAC includes attempting to establish a connection with one or more other target PSCells based at least in part on detecting the failure, and releasing the configuration information for the CPAC based at least in part on failing to establish the connection with one or more other PSCells.

In a sixth aspect, alone or in combination with one or more of the first through fifth aspects, performing the action to recover the CPAC includes initiating a recovery timer based at least in part on detecting the failure.

In a seventh aspect, alone or in combination with one or more of the first through sixth aspects, a connection with the primary cell remains established after the failure is detected, and performing the action to recover the CPAC includes transmitting, to the primary cell, secondary cell group failure information based at least in part on an expiration of the recovery timer prior to establishing a connection with a second target PSCell.

In an eighth aspect, alone or in combination with one or more of the first through seventh aspects, a connection with the primary cell is suspended after the failure is detected, and performing the action to recover the CPAC includes establishing a connection with a different primary cell based at least in part on an expiration of the recovery timer prior to establishing a connection with a second target PSCell, and transmitting, to the different primary cell, secondary cell group failure information in a radio link failure report or another report.

In a ninth aspect, alone or in combination with one or more of the first through eighth aspects, receiving the configuration information includes receiving an indication of an amount of time associated with the recovery timer.

In a tenth aspect, alone or in combination with one or more of the first through ninth aspects, a connection with the primary cell is suspended after the failure is detected, and performing the action to recover the CPAC includes selecting a second target PSCell for the CPAC, and establishing a connection with the second target PSCell based at least in part on the configuration information indicating a configuration associated with the second target PSCell.

In an eleventh aspect, alone or in combination with one or more of the first through tenth aspects, a connection with the primary cell is suspended after the failure is detected, and performing the action to recover the CPAC includes selecting a second target PSCell for the CPAC, and transmitting a cell re-establishment request message based at least in part on the second target PSCell not being included in the one or more candidate PSCells indicated by the configuration information.

In a twelfth aspect, alone or in combination with one or more of the first through eleventh aspects, a connection with the primary cell is suspended after the failure is detected, and performing the action to recover the CPAC includes establishing a connection with a second target PSCell, and transmitting, to a node associated with the primary cell and based at least in part on establishing the connection with the second target PSCell, a reconfiguration complete message via an SRB associated with the node.

In a thirteenth aspect, alone or in combination with one or more of the first through twelfth aspects, the SRB is an SRB 3 or a split SRB 1.

In a fourteenth aspect, alone or in combination with one or more of the first through thirteenth aspects, the SRB is an SRB 3, and the reconfiguration complete message is forwarded to the node associated with the primary cell by a node associated with the second target PSCell.

In a fifteenth aspect, alone or in combination with one or more of the first through fourteenth aspects, a connection with the primary cell is suspended after the failure is detected, and performing the action to recover the CPAC includes establishing a connection with a second target PSCell based at least in part on performing the action, and transmitting, based at least in part on establishing the connection with the second target PSCell, master cell group failure information associated with the primary cell.

In a sixteenth aspect, alone or in combination with one or more of the first through fifteenth aspects, performing the action to recover the CPAC includes transmitting, to the primary cell, first secondary cell group failure information for the CPAC associated with the first target PSCell.

In a seventeenth aspect, alone or in combination with one or more of the first through sixteenth aspects, transmitting the first secondary cell group failure information for the CPAC associated with the first target PSCell includes transmitting the first secondary cell group failure information including an indication that the first secondary cell group failure information is associated with an initial failure associated with the CPAC.

In an eighteenth aspect, alone or in combination with one or more of the first through seventeenth aspects, process 800 includes transmitting, to the primary cell, second secondary cell group failure information indicating that the CPAC could not be recovered, and removing content associated with the first secondary cell group failure information from a memory based at least in part on transmitting the second secondary cell group failure information.

In a nineteenth aspect, alone or in combination with one or more of the first through eighteenth aspects, process 800 includes transmitting, to the primary cell, capability information indicating whether the UE supports a recovery procedure associated with the CPAC.

In a twentieth aspect, alone or in combination with one or more of the first through nineteenth aspects, process 800 includes transmitting, to the primary cell, capability information indicating that the UE supports a recovery procedure associated with the CPAC, and receiving the configuration information includes receiving, based at least in part on transmitting the capability information, the configuration information indicating that the recovery procedure is supported.

In a twenty-first aspect, alone or in combination with one or more of the first through twentieth aspects, process 800 includes transmitting, to the primary cell, capability information indicating whether the UE supports a recovery procedure associated with the CPAC after reporting secondary cell group failure information associated with an initial failure associated with the CPAC.

In a twenty-second aspect, alone or in combination with one or more of the first through twenty-first aspects, process 800 includes transmitting, to the primary cell, capability information indicating whether the UE supports reporting secondary cell group failure information associated with an initial failure associated with the CPAC.

In a twenty-third aspect, alone or in combination with one or more of the first through twenty-second aspects, process 800 includes transmitting, to the primary cell, capability information indicating whether the UE supports reporting secondary cell group failure information associated with an initial failure of the CPAC, and receiving the configuration information includes receiving, based at least in part on transmitting the capability information, the configuration information indicating that secondary cell group failure information associated with initial failures of the CPAC are to be reported.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
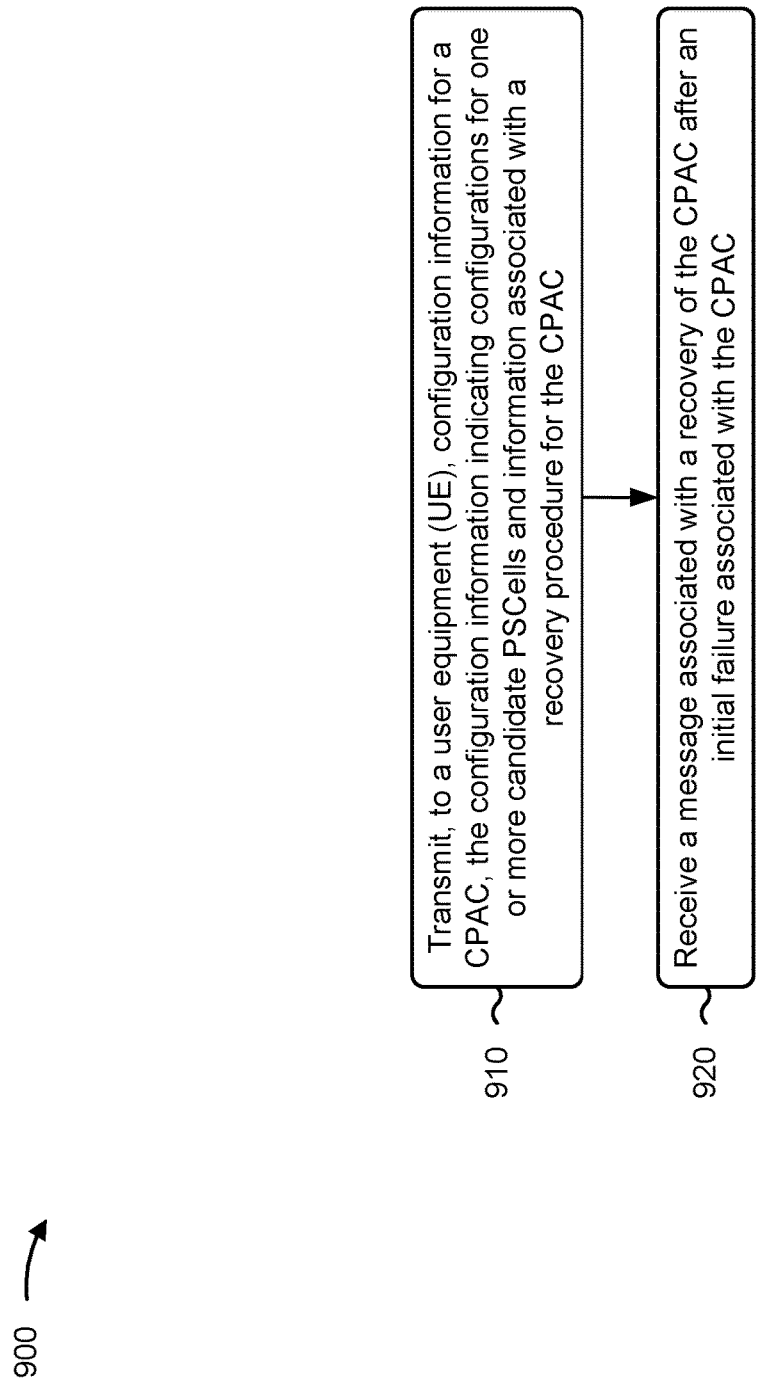

FIG. 9 is a diagram illustrating an example process 900 performed, for example, by a network entity, in accordance with the present disclosure. Example process 900 is an example where the network entity (e.g., base station 110 or another network entity) performs operations associated with a CPAC recovery procedure.

As shown in FIG. 9, in some aspects, process 900 may include transmitting, to a UE, configuration information for a CPAC, the configuration information indicating configurations for one or more candidate PSCells and information associated with a recovery procedure for the CPAC (block 910). For example, the network entity (e.g., using communication manager 150 and/or transmission component 1104, depicted in FIG. 11) may transmit, to a UE, configuration information for a CPAC, the configuration information indicating configurations for one or more candidate PSCells and information associated with a recovery procedure for the CPAC, as described above.

As further shown in FIG. 9, in some aspects, process 900 may include receiving a message associated with a recovery of the CPAC after an initial failure (block 920). For example, the network entity (e.g., using communication manager 150 and/or reception component 1102, depicted in FIG. 11) may receive a message associated with a recovery of the CPAC after an initial failure, as described above.

Process 900 may include additional aspects, such as any single aspect or any combination of aspects described below and/or in connection with one or more other processes described elsewhere herein.

In a first aspect, the network entity is associated with a primary cell or a master cell group.

In a second aspect, alone or in combination with the first aspect, receiving the message includes receiving, from the UE, a reconfiguration complete message indicating that the UE has established a connection with a PSCell after an initial failure associated with the CPAC.

In a third aspect, alone or in combination with one or more of the first and second aspects, receiving the message includes receiving, from the UE, secondary cell group failure information indicating that the UE was unable to establish a connection with a PSCell after an initial failure associated with the CPAC.

In a fourth aspect, alone or in combination with one or more of the first through third aspects, receiving the message includes receiving, from a PSCell, a reconfiguration complete message indicating that the UE has established a connection with the PSCell after an initial failure associated with the CPAC, where the PSCell forwards the reconfiguration message to the network entity from the UE.

In a fifth aspect, alone or in combination with one or more of the first through fourth aspects, transmitting the configuration information includes transmitting an indication of an amount of time associated with a recovery timer for the CPAC.

In a sixth aspect, alone or in combination with one or more of the first through fifth aspects, receiving the message includes receiving, from the UE, first secondary cell group failure information for the CPAC indicating an initial failure associated with the CPAC.

In a seventh aspect, alone or in combination with one or more of the first through sixth aspects, receiving the first secondary cell group failure information includes receiving the first secondary cell group failure information including an indication that the first secondary cell group failure information is associated with an initial failure associated with the CPAC.

In an eighth aspect, alone or in combination with one or more of the first through seventh aspects, process 900 includes determining reconfiguration information for the CPAC based at least in part on receiving the first secondary cell group failure information.

In a ninth aspect, alone or in combination with one or more of the first through eighth aspects, process 900 includes receiving, from the UE, capability information indicating whether the UE supports the recovery procedure associated with the CPAC.

In a tenth aspect, alone or in combination with one or more of the first through ninth aspects, process 900 includes receiving, from the UE, capability information indicating whether the UE supports a recovery procedure associated with the CPAC after reporting secondary cell group failure information associated with an initial failure of the CPAC.

In an eleventh aspect, alone or in combination with one or more of the first through tenth aspects, process 900 includes receiving, from the UE, capability information indicating whether the UE supports reporting secondary cell group failure information associated with an initial failure of the CPAC.

In a twelfth aspect, alone or in combination with one or more of the first through eleventh aspects, process 900 includes receiving, from the UE, capability information indicating whether the UE supports reporting secondary cell group failure information associated with an initial failure of the CPAC, and transmitting the configuration information includes transmitting, based at least in part on receiving the capability information, the configuration information indicating that secondary cell group failure information associated with initial failures of the CPAC are to be reported.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
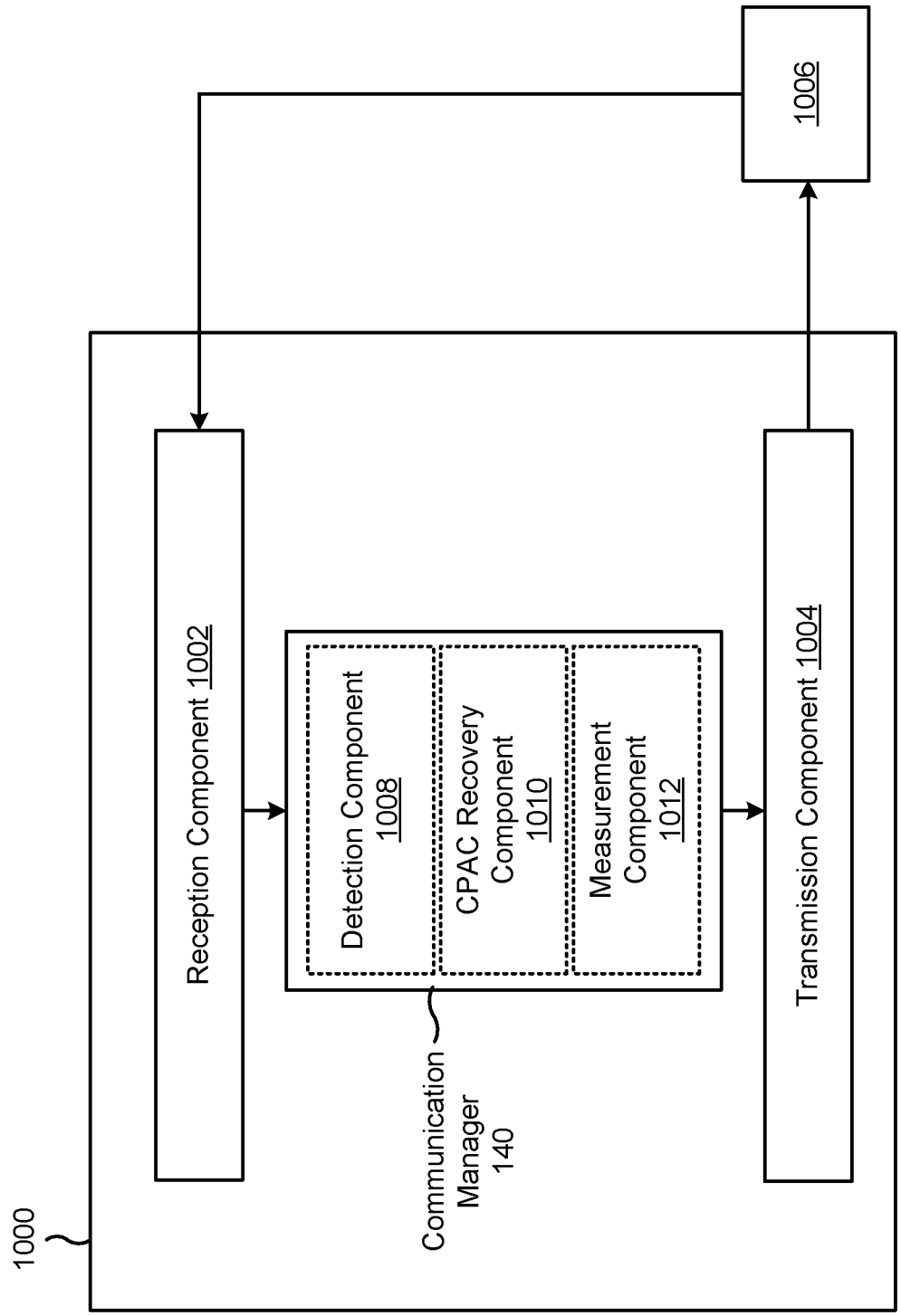
FIGS. 10 and 11 are diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a detection component 1008, a CPAC recovery component 1010, and/or a measurement component 1012, among other examples.

In some aspects, the apparatus 1000 may be configured to perform one or more operations described herein in connection with FIGS. 7A and 7B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a primary cell or a PSCell, configuration information for a CPAC, the configuration information indicating configurations for one or more candidate PSCells. The detection component 1008 may detect a failure, associated with the CPAC, associated with a first target PSCell of the one or more candidate PSCells. The CPAC recovery component 1010 may perform an action to recover the CPAC based at least in part on detecting the failure, wherein the action is based at least in part on at least one of: a first one or more measurement values associated with the one or more candidate PSCells performed by the UE prior to detecting the failure, or a second one or more measurement values associated with the one or more candidate PSCells performed by the UE after detecting the failure.

The measurement component 1012 may measure one or more PSCells to obtain the first one or more measurement values associated with the one or more PSCells.

The CPAC recovery component 1010 may select the first target PSCell for the CPAC based at least in part on the first one or more measurement values.

The measurement component 1012 may measure one or more PSCells to obtain the first one or more measurement values associated with the one or more PSCells.

The CPAC recovery component 1010 may select the first target PSCell based at least in part on the first one or more measurement values for the CPAC.

The measurement component 1012 may measure one or more PSCells to obtain the first one or more measurement values associated with the one or more PSCells, wherein multiple measurement values of the first one or more measurement values satisfy a condition associated with executing the CPAC.

The reception component 1002 may receive, from the primary cell, reconfiguration information based at least in part on at least one of: transmission (e.g., by the transmission component 1004), to the primary cell, of a reconfiguration complete message indicating that a connection has been established with a second target PSCell; transmission (e.g., by the transmission component 1004), to the primary cell, of second secondary cell group failure information indicating that the CPAC could not be recovered; or an expiration of a recovery timer associated with the CPAC.

The transmission component 1004 may transmit, to the primary cell, second secondary cell group failure information indicating that the CPAC could not be recovered.

The CPAC recovery component 1010 may remove content associated with the first secondary cell group failure information from a memory based at least in part on transmitting the second secondary cell group failure information.

The transmission component 1004 may transmit, to the primary cell, capability information indicating whether the UE supports a recovery procedure associated with the CPAC.

The transmission component 1004 may transmit, to the primary cell, capability information indicating that the UE supports a recovery procedure associated with the CPAC wherein receiving the configuration information comprises.

The reception component 1002 may receive, based at least in part on transmitting the capability information, the configuration information indicating that the recovery procedure is supported.

The transmission component 1004 may transmit, to the primary cell, capability information indicating whether the UE supports a recovery procedure associated with the CPAC after reporting secondary cell group failure information associated with an initial failure of the CPAC.

The transmission component 1004 may transmit, to the primary cell, capability information indicating whether the UE supports reporting secondary cell group failure information associated with an initial failure of the CPAC.

The transmission component 1004 may transmit, to the primary cell, capability information indicating whether the UE supports reporting secondary cell group failure information associated with an initial failure of the CPAC wherein receiving the configuration information comprises.

The reception component 1002 may receive, based at least in part on transmitting the capability information, the configuration information indicating that secondary cell group failure information associated with initial failures of the CPAC are to be reported.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
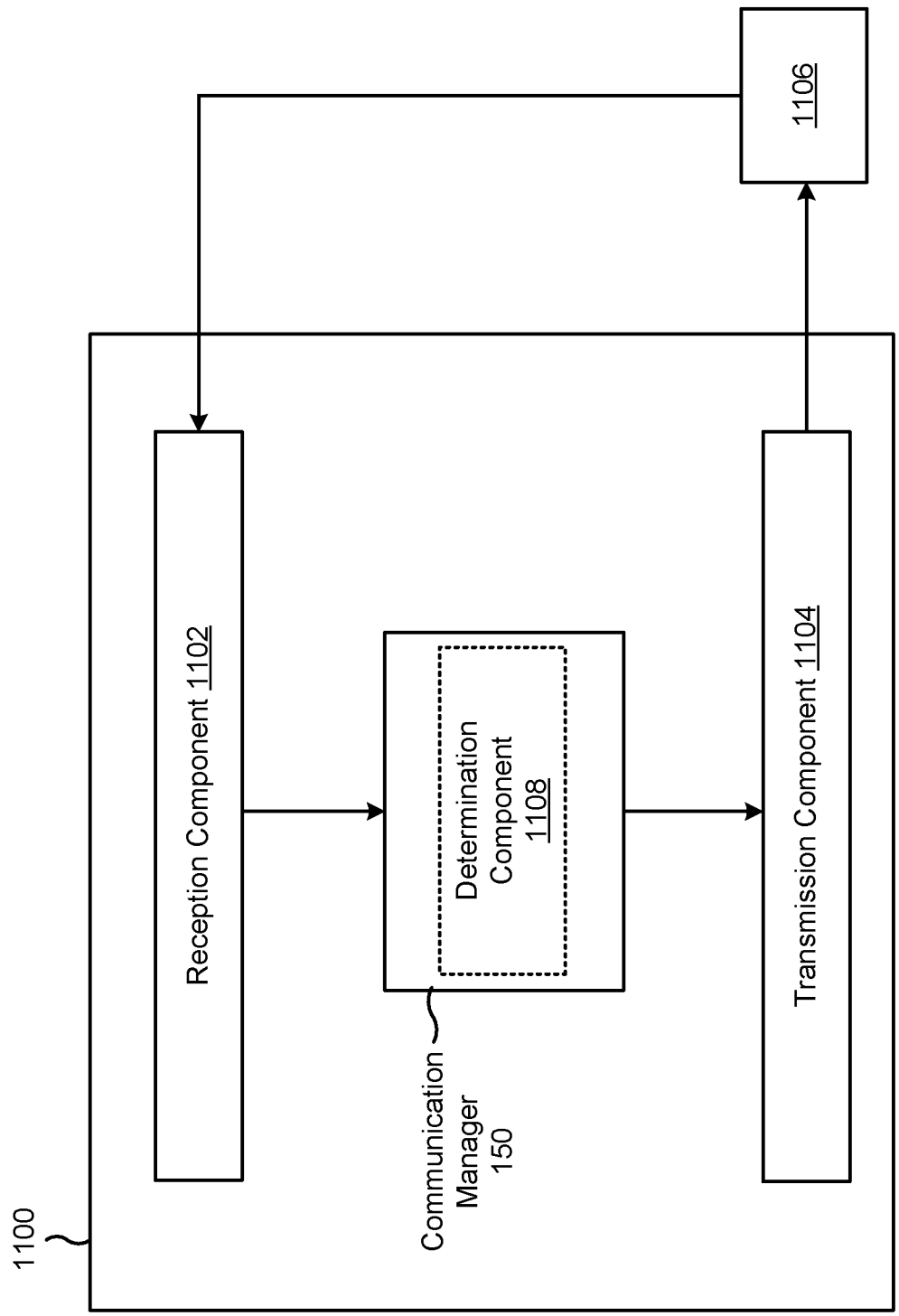

FIG. 11 is a block diagram of an example apparatus 1100 for wireless communication. The apparatus 1100 may be a network entity, such as base station, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIGS. 7A and 7B. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a UE, configuration information for a CPAC, the configuration information indicating configurations for one or more candidate PSCells and information associated with a recovery procedure for the CPAC. The reception component 1102 may receive a message associated with a recovery of the CPAC after an initial failure.

The determination component 1108 may determine the configuration information. The determination component 1108 may determine information associated with a CPAC recovery procedure.

The determination component 1108 may determine reconfiguration information for the CPAC based at least in part on receiving the first secondary cell group failure information.

The transmission component 1104 may transmit, to the UE, reconfiguration information based at least in part on at least one of: receiving (e.g., by the reception component 1102), from the UE, a reconfiguration complete message indicating that the UE has established a connection with a PSCell; receiving (e.g., by the reception component 1102), from the UE, second secondary cell group failure information indicating that the CPAC could not be recovered; or an expiration of a recovery timer associated with the CPAC.

The reception component 1102 may receive, from the UE, capability information indicating whether the UE supports the recovery procedure associated with the CPAC.

The reception component 1102 may receive, from the UE, capability information indicating that the UE supports the recovery procedure associated with the CPAC.

The reception component 1102 may receive, from the UE, capability information indicating whether the UE supports a recovery procedure associated with the CPAC after reporting secondary cell group failure information associated with an initial failure of the CPAC.

The reception component 1102 may receive, from the UE, capability information indicating whether the UE supports reporting secondary cell group failure information associated with an initial failure of the CPAC.

The reception component 1102 may receive, from the UE, capability information indicating whether the UE supports reporting secondary cell group failure information associated with an initial failure of the CPAC, wherein transmitting the configuration information comprises: transmitting, based at least in part on receiving the capability information, the configuration information indicating that secondary cell group failure information associated with initial failures of the CPAC are to be reported.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure: Aspect 1: A method of wireless communication performed by a user equipment (UE), comprising: receiving, from a primary cell or a primary secondary cell (PSCell), configuration information for a conditional PSCell addition or change (CPAC), the configuration information indicating configurations for one or more candidate PSCells; detecting a failure, associated with the CPAC, associated with a first target PSCell of the one or more candidate PSCells; and performing an action to recover the CPAC based at least in part on detecting the failure, wherein the action is based at least in part on at least one of: a first one or more measurement values associated with the one or more candidate PSCells performed by the UE prior to detecting the failure, or a second one or more measurement values associated with the one or more candidate PSCells performed by the UE after detecting the failure.

Aspect 2: The method of Aspect 1, further comprising: selecting the first target PSCell for the CPAC from the one or more candidate PSCells based at least in part on the first one or more measurement values, wherein performing the action to recover the CPAC comprises: selecting a second target PSCell from the one or more candidate PSCells based at least in part on the first one or more measurement values; and performing a CPAC associated with the second target PSCell to recover the CPAC.

Aspect 3: The method of Aspect 1, further comprising: selecting the first target PSCell, from the one or more candidate PSCells, based at least in part on the first one or more measurement values for the CPAC, wherein performing the action to recover the CPAC comprises: selecting a second target PSCell from the one or more candidate PSCells based at least in part on the second one or more measurement values; and performing a CPAC associated with the second target PSCell to recover the CPAC.

Aspect 4: The method of any of Aspects 1-3, wherein performing the action to recover the CPAC comprises: transmitting, to the primary cell, secondary cell group failure information based at least in part on none of the first one or more measurement values associated with the one or more candidate PSCells satisfying a condition associated with executing the CPAC.

Aspect 5: The method of any of Aspects 1-4, wherein receiving the configuration information for the CPAC comprises: receiving an indication of a threshold signal strength value or a threshold signal quality value to be used for selecting target PSCells after a CPAC failure.

Aspect 6: The method of any of Aspects 1-5, wherein multiple measurement values of the first one or more measurement values satisfy a condition associated with executing the CPAC, wherein performing the action to recover the CPAC comprises: selecting a second target PSCell, from the one or more candidate PSCells, for the CPAC based at least in part on prioritizing PSCells associated with the multiple measurement values.

Aspect 7: The method of any of Aspects 1-6, wherein a connection with the primary cell remains established after the failure is detected, and wherein performing the action to recover the CPAC comprises: selecting a second target PSCell for the CPAC; and establishing a connection with the second target PSCell based at least in part on the configuration information indicating a configuration associated with the second target PSCell.

Aspect 8: The method of any of Aspects 1-6, wherein a connection with the primary cell remains established after the failure is detected, and wherein performing the action to recover the CPAC comprises: selecting a second target PSCell for the CPAC; and transmitting, to the primary cell, secondary cell group failure information based at least in part on the second target PSCell not being included in the one or more candidate PSCells indicated by the configuration information.

Aspect 9: The method of any of Aspects 1-8, wherein performing the action to recover the CPAC comprises: attempting to establish a connection with one or more other candidate PSCells based at least in part on detecting the failure; and releasing the configuration information for the CPAC based at least in part on failing to establish the connection with one or more other candidate PSCells.

Aspect 10: The method of any of Aspects 1-9, wherein performing the action to recover the CPAC comprises: initiating a recovery timer based at least in part on detecting the failure.

Aspect 11: The method of Aspect 10, wherein a connection with the primary cell remains established after the failure is detected, and wherein performing the action to recover the CPAC comprises: transmitting, to the primary cell, secondary cell group failure information based at least in part on an expiration of the recovery timer prior to establishing a connection with a second target PSCell.

Aspect 12: The method of Aspect 10, wherein a connection with the primary cell is suspended after the failure is detected, and wherein performing the action to recover the CPAC comprises: establishing a connection with a different primary cell based at least in part on an expiration of the recovery timer prior to establishing a connection with a second target PSCell; and transmitting, to the different primary cell, secondary cell group failure information in a radio link failure report or another report.

Aspect 13: The method of any of Aspects 10-112, wherein receiving the configuration information comprises: receiving an indication of an amount of time associated with the recovery timer.

Aspect 14: The method of any of Aspects 1-13, wherein a connection with the primary cell is suspended after the failure is detected, and wherein performing the action to recover the CPAC comprises: selecting a second target PSCell for the CPAC; and establishing a connection with the second target PSCell based at least in part on the configuration information indicating a configuration associated with the second target PSCell.

Aspect 15: The method of any of Aspects 1-14, wherein a connection with the primary cell is suspended after the failure is detected, and wherein performing the action to recover the CPAC comprises: selecting a second target PSCell for the CPAC; and transmitting a cell re-establishment request message based at least in part on the second target PSCell not being included in the one or more candidate PSCells indicated by the configuration information.

Aspect 16: The method of any of Aspects 1-15, wherein a connection with the primary cell is suspended after the failure is detected, and wherein performing the action to recover the CPAC comprises: establishing a connection with a second target PSCell; and transmitting, to a node associated with the primary cell and based at least in part on establishing the connection with the second target PSCell, a reconfiguration complete message via a signaling radio bearer (SRB) associated with the node.

Aspect 17: The method of Aspect 16, wherein the SRB is an SRB 3 or a split SRB 1.

Aspect 18: The method of any of Aspects 16-17, wherein the SRB is an SRB 3, and wherein the reconfiguration complete message is forwarded to the node associated with the primary cell by a node associated with the second target PSCell.

Aspect 19: The method of any of Aspects 1-18, wherein a connection with the primary cell is suspended after the failure is detected, and wherein performing the action to recover the CPAC comprises: establishing a connection with a second target PSCell; and transmitting, based at least in part on establishing the connection with the second target PSCell, master cell group failure information associated with the primary cell.

Aspect 20: The method of any of Aspects 1-19, wherein performing the action to recover the CPAC comprises:

transmitting, to the primary cell, first secondary cell group failure information for the CPAC associated with the first target PSCell.

Aspect 21: The method of Aspect 20, wherein transmitting the first secondary cell group failure information for the CPAC associated with the first target PSCell comprises: transmitting the first secondary cell group failure information including an indication that the first secondary cell group failure information is associated with an initial failure associated with the CPAC.

Aspect 22: The method of any of Aspects 20-21, further comprising: receiving, from the primary cell, reconfiguration information based at least in part on at least one of: transmitting, to the primary cell, a reconfiguration complete message indicating that a connection has been established with a second target PSCell; transmitting, to the primary cell, second secondary cell group failure information indicating that the CPAC could not be recovered; or an expiration of a recovery timer associated with the CPAC.

Aspect 23: The method of any of Aspects 20-22, further comprising: transmitting, to the primary cell, second secondary cell group failure information indicating that the CPAC could not be recovered; and removing content associated with the first secondary cell group failure information from a memory based at least in part on transmitting the second secondary cell group failure information.

Aspect 24: The method of any of Aspects 1-23, further comprising: transmitting, to the primary cell, capability information indicating whether the UE supports a recovery procedure associated with the CPAC.

Aspect 25: The method of any of Aspects 1-24, further comprising: transmitting, to the primary cell, capability information indicating that the UE supports a recovery procedure associated with the CPAC, wherein receiving the configuration information comprises: receiving, based at least in part on transmitting the capability information, the configuration information indicating that the recovery procedure is supported.

Aspect 26: The method of any of Aspects 1-25, further comprising: transmitting, to the primary cell, capability information indicating whether the UE supports a recovery procedure associated with the CPAC after reporting secondary cell group failure information associated with an initial failure of the CPAC.

Aspect 27: The method of any of Aspects 1-26, further comprising: transmitting, to the primary cell, capability information indicating whether the UE supports reporting secondary cell group failure information associated with an initial failure of the CPAC.

Aspect 28: The method of any of Aspects 1-27, further comprising: transmitting, to the primary cell, capability information indicating whether the UE supports reporting secondary cell group failure information associated with an initial failure of the CPAC, wherein receiving the configuration information comprises: receiving, based at least in part on transmitting the capability information, the configuration information indicating that secondary cell group failure information associated with initial failures of the conditional PSCell addition or change are to be reported.

Aspect 29: A method of wireless communication performed by a network entity, comprising: transmitting, to a user equipment (UE), configuration information for a conditional primary secondary cell (PSCell) addition or change (CPAC), the configuration information indicating configurations for one or more candidate PSCells and information associated with a recovery procedure for the CPAC; and receiving a message associated with a recovery of the CPAC after an initial failure.

Aspect 30: The method of Aspect 29, wherein the network entity is associated with a primary cell or a master cell group.

Aspect 31: The method of any of Aspects 29-30, wherein receiving the message comprises: receiving, from the UE, a reconfiguration complete message indicating that the UE has established a connection with a PSCell after an initial failure associated with the CPAC.

Aspect 32: The method of any of Aspects 29-30, wherein receiving the message comprises: receiving, from the UE, secondary cell group failure information indicating that the UE was unable to establish a connection with a PSCell after an initial failure associated with the CPAC.

Aspect 33: The method of any of Aspects 29-31, wherein receiving the message comprises: receiving, from a PSCell, a reconfiguration complete message indicating that the UE has established a connection with the PSCell after an initial failure associated with the CPAC.

Aspect 34: The method of any of Aspects 29-33, wherein transmitting the configuration information comprises: transmitting an indication of an amount of time associated with a recovery timer for the CPAC.

Aspect 35: The method of any of Aspects 29-34, wherein receiving the message comprises: receiving, from the UE, first secondary cell group failure information for the CPAC indicating an initial failure associated with the CPAC.

Aspect 36: The method of Aspect 35, wherein receiving the first secondary cell group failure information comprises: receiving the first secondary cell group failure information including an indication that the first secondary cell group failure information is associated with an initial failure of the CPAC.

Aspect 37: The method of any of Aspects 35-36, further comprising: determining reconfiguration information for the CPAC based at least in part on receiving the first secondary cell group failure information.

Aspect 38: The method of any of Aspects 35-37, further comprising: transmitting, to the UE, reconfiguration information based at least in part on at least one of: receiving, from the UE, a reconfiguration complete message indicating that the UE has established a connection with a PSCell; receiving, from the UE, second secondary cell group failure information indicating that the CPAC could not be recovered; or an expiration of a recovery timer associated with the CPAC.

Aspect 39: The method of any of Aspects 29-38, further comprising: receiving, from the UE, capability information indicating whether the UE supports the recovery procedure associated with the CPAC.

Aspect 40: The method of any of Aspects 29-39, further comprising: receiving, from the UE, capability information indicating that the UE supports the recovery procedure associated with the CPAC, wherein transmitting the configuration information comprises: transmitting, based at least in part on receiving the capability information, the configuration information indicating that the recovery procedure is supported.

Aspect 41: The method of any of Aspects 29-40, further comprising: receiving, from the UE, capability information indicating whether the UE supports a recovery procedure associated with the CPAC after reporting secondary cell group failure information associated with an initial failure of the CPAC.

Aspect 42: The method of any of Aspects 29-41, further comprising: receiving, from the UE, capability information indicating whether the UE supports reporting secondary cell group failure information associated with an initial failure of the CPAC.

Aspect 43: The method of any of Aspects 29-42, further comprising: receiving, from the UE, capability information indicating whether the UE supports reporting secondary cell group failure information associated with an initial failure of the CPAC, wherein transmitting the configuration information comprises: transmitting, based at least in part on receiving the capability information, the configuration information indicating that secondary cell group failure information associated with initial failures of the CPAC are to be reported.

Aspect 44: An apparatus for wireless communication at a device, comprising a processor; memory coupled with the processor; and instructions stored in the memory and executable by the processor to cause the apparatus to perform the method of one or more of Aspects 1-28.

Aspect 45: A device for wireless communication, comprising a memory and one or more processors coupled to the memory, the one or more processors configured to perform the method of one or more of Aspects 1-28.

Aspect 46: An apparatus for wireless communication, comprising at least one means for performing the method of one or more of Aspects 1-28.

Aspect 47: A non-transitory computer-readable medium storing code for wireless communication, the code comprising instructions executable by a processor to perform the method of one or more of Aspects 1-28.

Aspect 48: A non-transitory computer-readable medium storing a set of instructions for wireless communication, the set of instructions comprising one or more instructions that, when executed by one or more processors of a device, cause the device to perform the method of one or more of Aspects 1-28.

Aspect 49: An apparatus for wireless communication at a device, comprising a processor; memory coupled with the processor; and instructions stored in the memory and executable by the processor to cause the apparatus to perform the method of one or more of Aspects 29-43.

Aspect 50: A device for wireless communication, comprising a memory and one or more processors coupled to the memory, the one or more processors configured to perform the method of one or more of Aspects 29-43.

Aspect 52: An apparatus for wireless communication, comprising at least one means for performing the method of one or more of Aspects 29-43.

Aspect 53: A non-transitory computer-readable medium storing code for wireless communication, the code comprising instructions executable by a processor to perform the method of one or more of Aspects 29-43.

Aspect 54: A non-transitory computer-readable medium storing a set of instructions for wireless communication, the set of instructions comprising one or more instructions that, when executed by one or more processors of a device, cause the device to perform the method of one or more of Aspects 29-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, which are configured, individually or in any combination, to:
receive, from a primary cell or a primary secondary cell (PSCell), configuration information for a conditional PSCell addition or change (CPAC), the configuration information indicating configurations for one or more candidate PSCells;
detect a failure, associated with the CPAC, associated with a first target PSCell among the one or more candidate PSCells; and
perform an action to recover the CPAC based at least in part on detecting the failure, wherein the one or more processors, to perform the action to recover the CPAC, are configured to transmit, to the primary cell, first secondary cell group failure information for the CPAC associated with the first target PSCell, wherein the first secondary cell group failure information includes an indication that the first secondary cell group failure information is associated with an initial failure of the CPAC, wherein the action is based at least in part on at least one of:
a first one or more measurement values associated with the one or more candidate PSCells obtained by the UE prior to detecting the failure, or
a second one or more measurement values associated with the one or more candidate PSCells obtained by the UE after detecting the failure.

2. The UE of claim 1, wherein the one or more processors are further configured to:
select the first target PSCell for the CPAC from the candidate PSCells based at least in part on the first one or more measurement values,
wherein the one or more processors are configured to:
select a second target PSCell from the one or more candidate PSCells based at least in part on the first one or more measurement values; and
perform a CPAC associated with the second target PSCell to recover the CPAC.

3. The UE of claim 1, wherein the one or more processors are further configured to:
select the first target PSCell for the CPAC from the one or more candidate PSCells based at least in part on the first one or more measurement values;
select a second target PSCell from the one or more candidate PSCells based at least in part on the second one or more measurement values; and
perform a CPAC associated with the second target PSCell to recover the CPAC.

4. The UE of claim 1, wherein the one or more processors are configured to:
transmit, to the primary cell, secondary cell group failure information based at least in part on at least one of:
no values of the first one or more measurement values satisfying a condition associated with executing the CPAC, or
no values of the second one or more measurement values satisfying the condition associated with executing the CPAC.

5. The UE of claim 1, wherein multiple measurement values of the first one or more measurement values satisfy a condition associated with executing the CPAC, and wherein the one or more processors are configured to:
select a second target PSCell for the CPAC from the one or more candidate PSCells based at least in part on prioritizing candidate PSCells associated with the multiple measurement values.

6. The UE of claim 1, wherein a connection with the primary cell remains established after the failure is detected, and wherein the one or more processors, to perform the action to recover the CPAC, are configured to:
establish a connection with a second target PSCell based at least in part on the configuration information indicating a configuration associated with the second target PSCell.

7. The UE of claim 1, wherein a connection with the primary cell remains established after the failure is detected, and wherein the one or more processors are configured to:
select a second target PSCell for the CPAC; and
transmit, to the primary cell, secondary cell group failure information based at least in part on the second target PSCell not being included in the one or more candidate PSCells indicated by the configuration information.

8. The UE of claim 1, wherein a connection with the primary cell is suspended after the failure is detected, and wherein the one or more processors are configured to:
select a second target PSCell for the CPAC; and
establish a connection with the second target PSCell based at least in part on the configuration information indicating a configuration associated with the second target PSCell; or
transmit a cell re-establishment request message based at least in part on the second target PSCell not being included in the one or more candidate PSCells indicated by the configuration information.

9. The UE of claim 1, wherein a connection with the primary cell is suspended after the failure is detected, and wherein the one or more processors are configured to:
establish a connection with a second target PSCell; and
transmit, to a node associated with the primary cell and based at least in part on establishing the connection with the second target PSCell, a reconfiguration complete message via a signaling radio bearer (SRB) associated with the node, wherein the SRB is an SRB 3 or a split SRB 1.

10. The UE of claim 1, wherein a connection with the primary cell is suspended after the failure is detected, and wherein the one or more processors are configured to:
establish a connection with a second target PSCell; and
transmit, based at least in part on establishing the connection with the second target PSCell, master cell group failure information associated with the primary cell.

11. The UE of claim 1, wherein the one or more processors are further configured to:
receive, from the primary cell, reconfiguration information based at least in part on at least one of:
transmitting, to the primary cell, a reconfiguration complete message indicating that a connection has been established with a second target PSCell;
transmitting, to the primary cell, second secondary cell group failure information indicating that the CPAC could not be recovered; or
an expiration of a recovery timer associated with the CPAC.

12. The UE of claim 1, wherein the one or more processors are further configured to:
transmit, to the primary cell, capability information indicating whether the UE supports a recovery procedure associated with the CPAC.

13. A network entity for wireless communication, comprising:
one or more memories; and
one or more processors, coupled to the one or more memories, which are configured, individually or in any combination, to:
transmit, to a user equipment (UE), configuration information for a conditional primary secondary cell (PSCell) addition or change (CPAC), the configuration information indicating configurations for one or more candidate PSCells and information associated with a recovery procedure for the CPAC; and
receive, from the UE, first secondary cell group failure information for the CPAC associated with a first target PSCell among the one or more candidate PSCells, wherein the first secondary cell group failure information includes an indication that the first secondary cell group failure information is associated with an initial failure of the CPAC.

14. The network entity of claim 13, wherein the one or more processors are configured to at least one of:
receive, from the UE, a reconfiguration complete message indicating that the UE has established a connection with a PSCell after the initial failure associated with the CPAC;
or
receive, from the PSCell, the reconfiguration complete message indicating that the UE has established the connection with the PSCell after the initial failure associated with the CPAC.

15. A method of wireless communication performed by a user equipment (UE), comprising:
receiving, from a primary cell or a primary secondary cell (PSCell), configuration information for a conditional PSCell addition or change (CPAC), the configuration information indicating configurations for one or more candidate PSCells;
detecting a failure, associated with the CPAC, associated with a first target PSCell among the one or more candidate PSCells; and
performing an action to recover the CPAC based at least in part on detecting the failure, wherein performing the action comprises transmitting, to the primary cell, first secondary cell group failure information for the CPAC associated with the first target PSCell, wherein the first secondary cell group failure information includes an indication that the first second cell group failure information is associated with an initial failure of the CPAC, wherein the action is based at least in part on at least one of:
a first one or more measurement values associated with the one or more candidate PSCells obtained by the UE prior to detecting the failure, or
a second one or more measurement values associated with the one or more candidate PSCells obtained by the UE after detecting the failure.

16. The method of claim 15, further comprising:
selecting the first target PSCell for the CPAC from the one or more candidate PSCells based at least in part on the first one or more measurement values;
selecting a second target PSCell from the one or more candidate PSCells based at least in part on the first one or more measurement values; and
performing a CPAC associated with the second target PSCell to recover the CPAC.

17. The method of claim 15, further comprising:
selecting the first target PSCell from the one or more candidate PSCells based at least in part on the first one or more measurement values for the CPAC;
selecting a second target PSCell from the one or more candidate PSCells based at least in part on the second one or more measurement values; and
performing a CPAC associated with the second target PSCell to recover the CPAC.

18. The method of claim 15, wherein receiving the configuration information for the CPAC comprises:
receiving an indication of a threshold signal strength value or a threshold signal quality value to be used for selecting target PSCells after a CPAC failure.

19. The method of claim 15, wherein multiple measurement values of the first one or more measurement values satisfy a condition associated with executing the CPAC, and wherein the method further comprises:
selecting a second target PSCell for the CPAC from the one or more candidate PSCells based at least in part on prioritizing PSCells associated with the multiple measurement values.

20. The method of claim 15, further comprising:
attempting to establish a connection with one or more other target PSCells from the one or more candidate PSCells based at least in part on detecting the failure; and
releasing the configuration information for the CPAC based at least in part on failing to establish the connection with the one or more other target PSCells.

21. The method of claim 15, wherein a connection with the primary cell is suspended after the failure is detected, and wherein the method further comprises:
establishing a connection with a second target PSCell; and
transmitting, to a node associated with the primary cell and based at least in part on establishing the connection with the second target PSCell, a reconfiguration complete message via a signaling radio bearer (SRB) associated with the node.

22. The method of claim 21, wherein the SRB is an SRB 3, and wherein the reconfiguration complete message is forwarded to the node associated with the primary cell by a node associated with the second target PSCell.

23. The method of claim 15, further comprising:
transmitting, to the primary cell, second secondary cell group failure information indicating that the CPAC could not be recovered; and
removing content associated with the first secondary cell group failure information from a memory based at least in part on transmitting the second secondary cell group failure information.

24. The method of claim 15, further comprising:
transmitting, to the primary cell, capability information indicating whether the UE supports a recovery procedure associated with the CPAC.

25. The method of claim 15, further comprising:
transmitting, to the primary cell, capability information indicating whether the UE supports a recovery procedure associated with the CPAC after reporting secondary cell group failure information associated with the initial failure of the CPAC.

26. The method of claim 15, further comprising:
transmitting, to the primary cell, capability information indicating whether the UE supports reporting secondary cell group failure information associated with the initial failure of the CPAC.

27. The method of claim 15, further comprising:
transmitting, to the primary cell, secondary cell group failure information based at least in part on at least one of:
no values of the first one or more measurement values satisfying a condition associated with executing the CPAC, or
no values of the second one or more measurement values satisfying the condition associated with executing the CPAC.

28. The method of claim 15, further comprising:
selecting a second target PSCell for the CPAC, wherein a connection with the primary cell remains established after the failure is detected; and
transmitting, to the primary cell, secondary cell group failure information based at least in part on the second target PSCell not being included in the one or more candidate PSCells indicated by the configuration information.

29. A method of wireless communication performed by a network entity, comprising:
transmitting, to a user equipment (UE), configuration information for a conditional primary secondary cell (PSCell) addition or change (CPAC), the configuration information indicating configurations for one or more candidate PSCells and information associated with a recovery procedure for the CPAC; and
receiving, from the UE, first secondary cell group failure information for the CPAC associated with a first target PSCell among the one or more candidate PSCells, wherein the first secondary cell group failure information includes an indication that the first secondary cell group failure information is associated with an initial failure of the CPAC.

30. The method of claim 29, further comprising:
determining reconfiguration information for the CPAC based at least in part on receiving the first secondary cell group failure information.

\* \* \* \* \*